United States Patent [19]

Jeppson

[11] 4,057,736
[45] Nov. 8, 1977

[54] ELECTRICAL POWER GENERATION AND DISTRIBUTION SYSTEM

[76] Inventor: Morris R. Jeppson, P.O. Box 4943, Carmel, Calif. 94921

[21] Appl. No.: 505,787

[22] Filed: Sept. 13, 1974

[51] Int. Cl.$^2$ .............................................. H02J 11/00
[52] U.S. Cl. ..................................... 307/78; 307/147; 290/1 R; 310/113
[58] Field of Search ................... 307/61, 77, 149–154, 307/43, 51, 52, 42, 53, 54, 55, 56, 57, 11–29, 78, 84, 4, 5, 6, 7, 8, 47, 61, 63, 69, 145, 146, 147; 290/4 D, 1 R, 2; 317/103; 174/40 R, 138 R; 310/113

[56] References Cited

U.S. PATENT DOCUMENTS

| 958,578 | 5/1910 | Ballard | 290/4 D |
|---|---|---|---|
| 1,684,253 | 9/1928 | Whitaker | 307/78 |
| 2,695,374 | 11/1954 | Jeppson | 31/113 X |
| 3,052,783 | 9/1962 | Buron | 200/148 B |

OTHER PUBLICATIONS

"Direct Current Transmission," vol. 1, by Edward Wilson Kimbark, published by Wiley-Interscience 1971 (pertinent pp. 3, 4, regarding the Thury System).

Primary Examiner—Robert K. Schaefer
Assistant Examiner—Morris Ginsburg
Attorney, Agent, or Firm—Phillips, Moore, Weissenberger, Lempio & Majestic

[57] ABSTRACT

Problems associated with moving fuel from remote sources to large centralized power generation plants are avoided with an economical system for collecting power from small stations located near the scattered, remote fuel sites. To avoid a need for many massive, costly transformers, a plurality of relatively low voltage generating stations are connected in series to cumulatively produce the high voltage needed for long-distance transmission line delivery. Power-generating devices of the successive stations are supported on insulative structures of progressively greater height and are driven or supplied with fuel through insulative means. The generating devices may take various forms including, for example, AC or DC generators driven through insulative drive shafts or fuel cells or magnetohydrodynamic devices supplied with fuel through insulative pipes and the system is adaptable to large-scale power production from scattered energy sources such as oil or natural gas wells, oil shale mines, geothermal steam wells, coal mines, solar energy sources or hydro-electric installations, for example. The stations may be adjacent, widely separated or vertically spaced apart within a single structure depending on the nature of the fuel source. Power may be converted to smaller voltages at the distribution region by coupling a plurality of electrical motors in series, each being supported on insulative structure, and each driving a generator through an insulative shaft.

45 Claims, 21 Drawing Figures

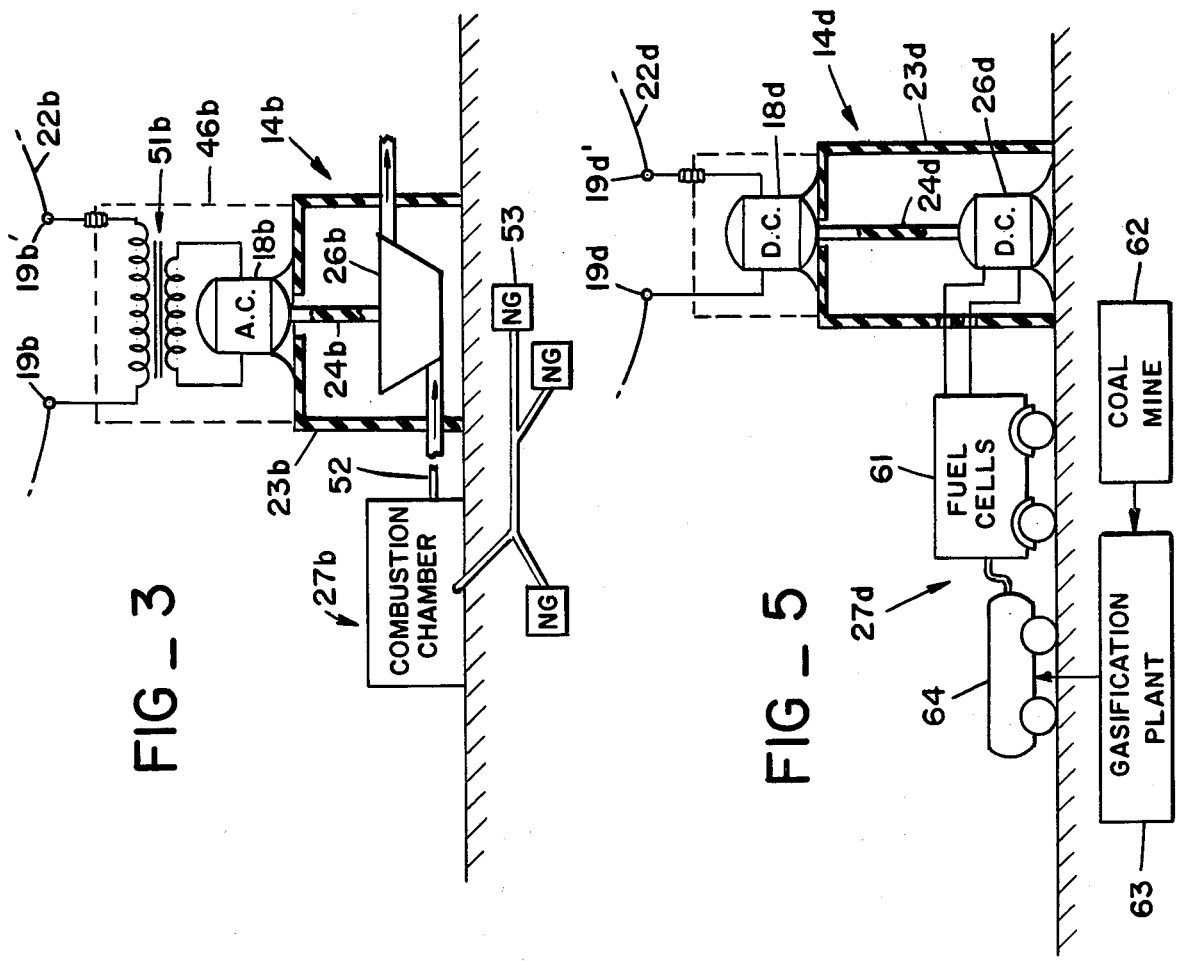
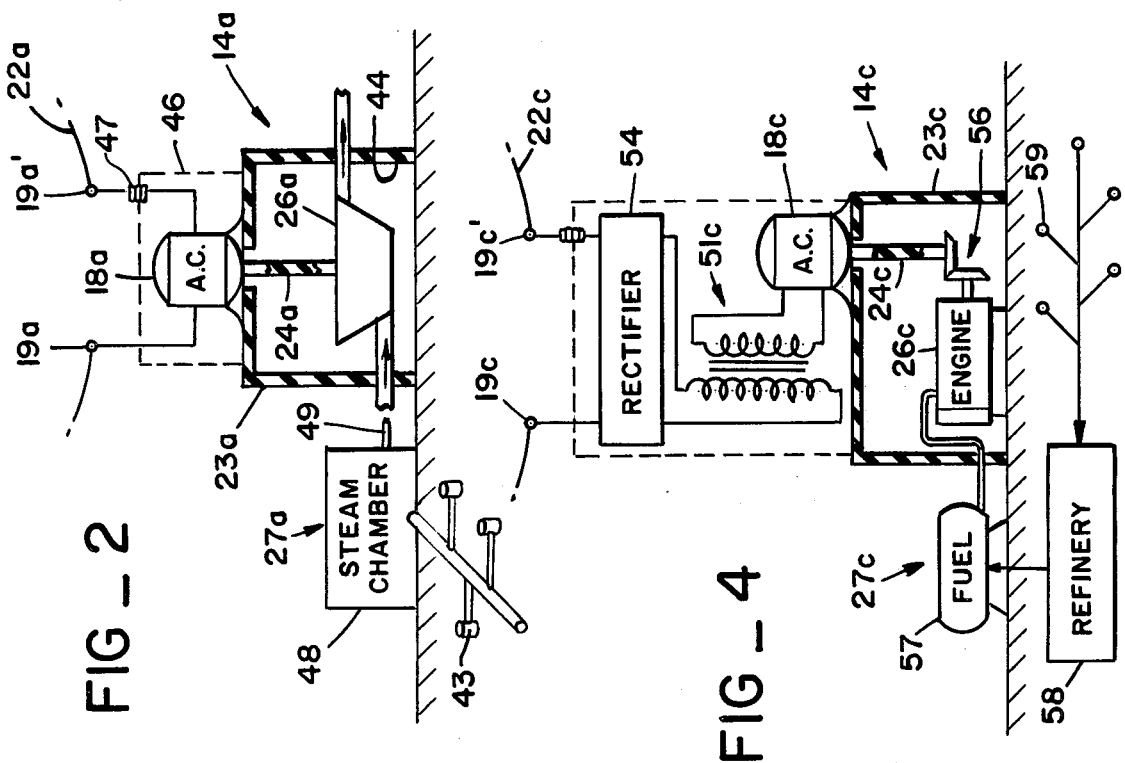

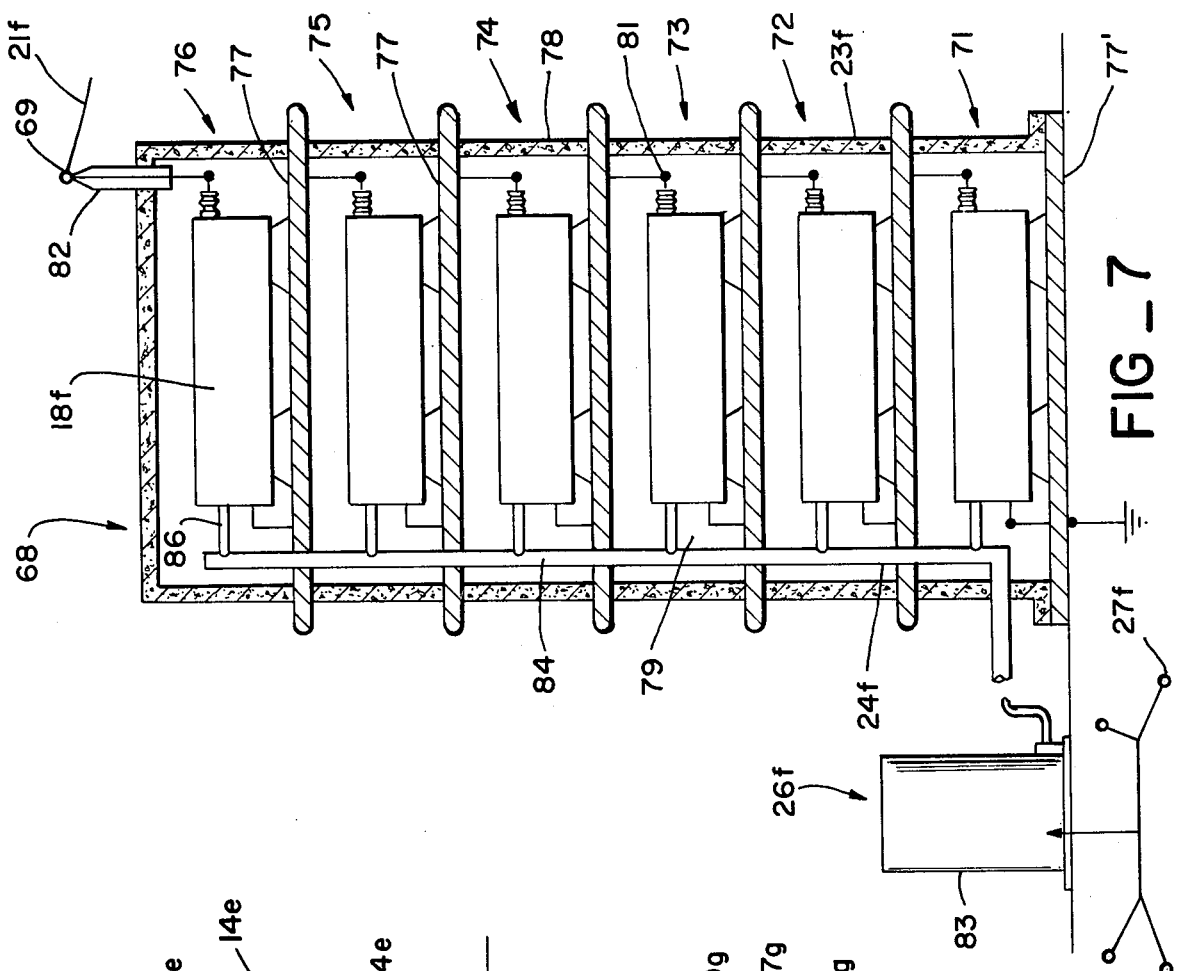
FIG_7
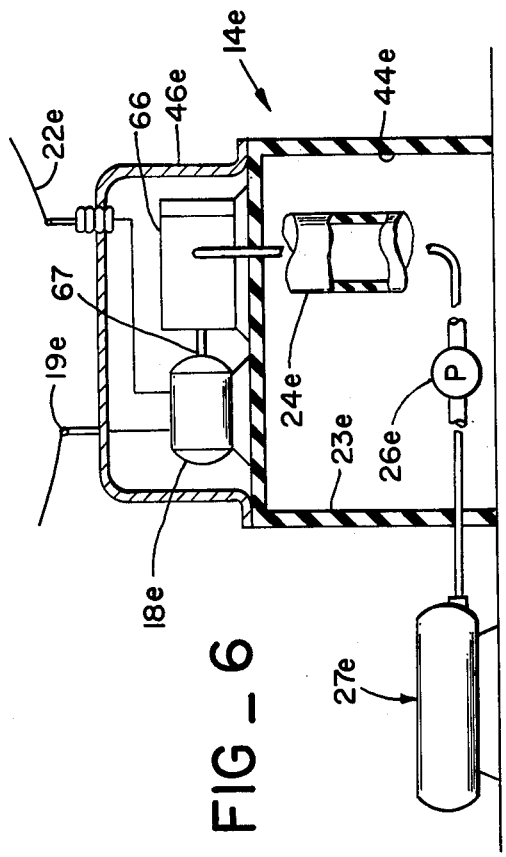
FIG_6
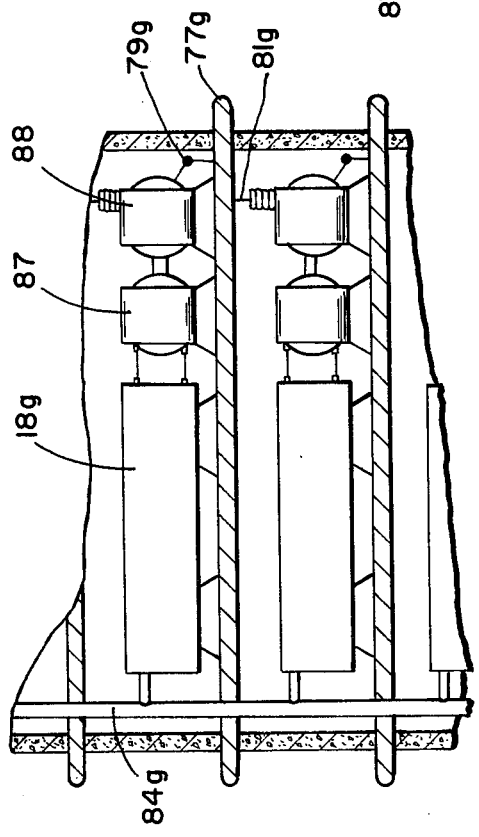
FIG_8

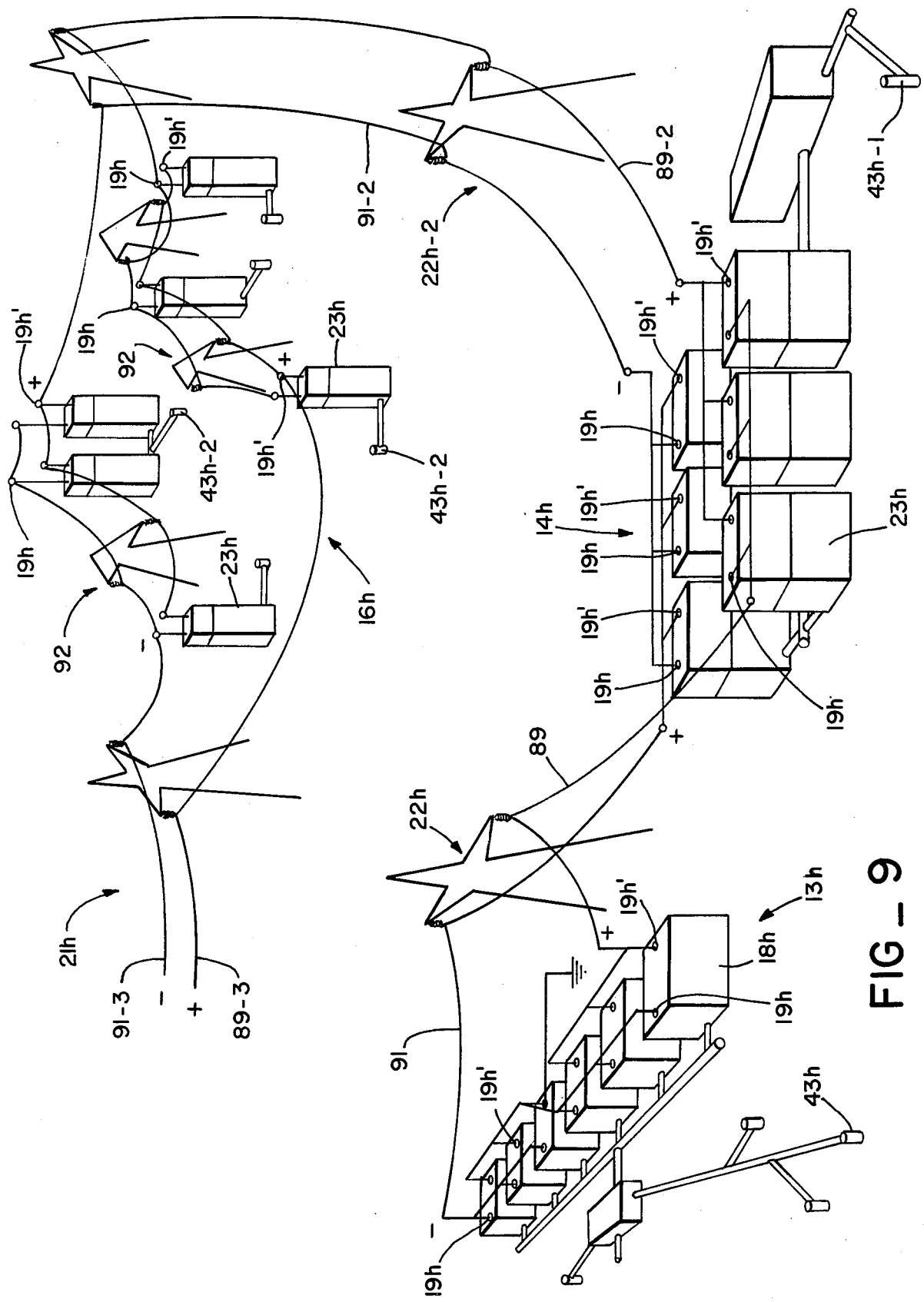

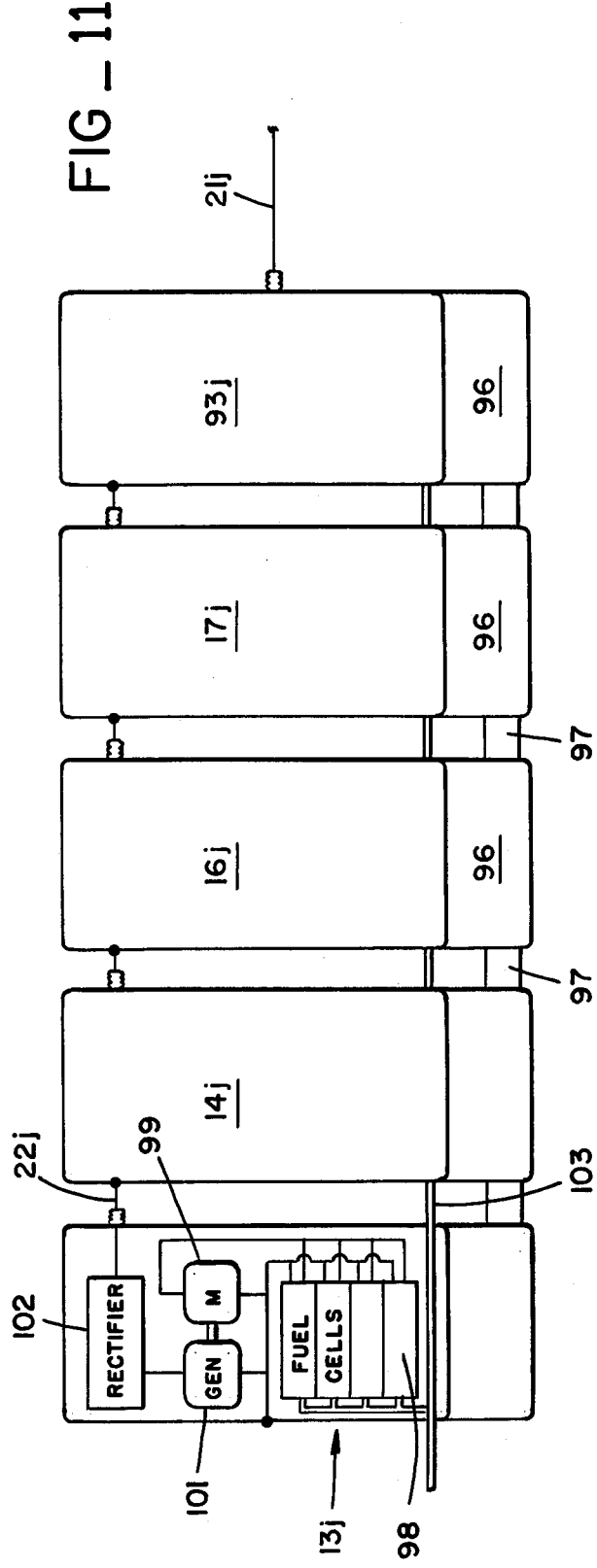
FIG_11
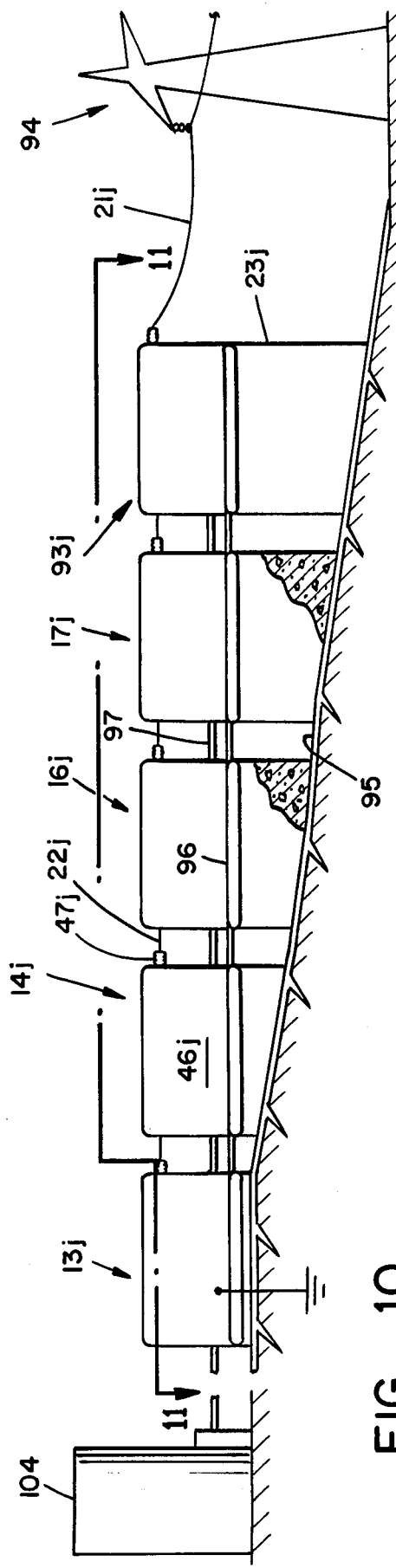
FIG_10

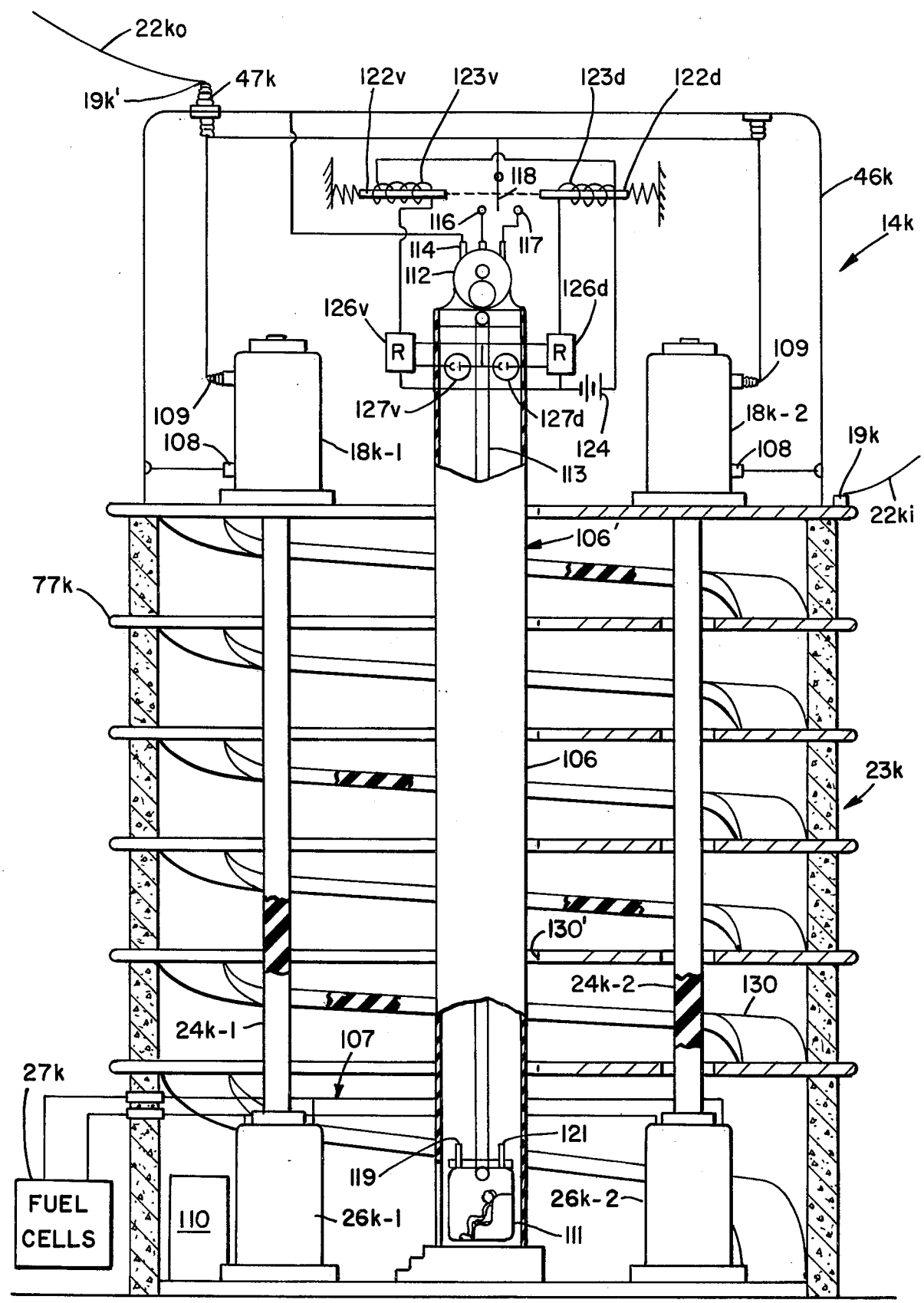
FIG_12

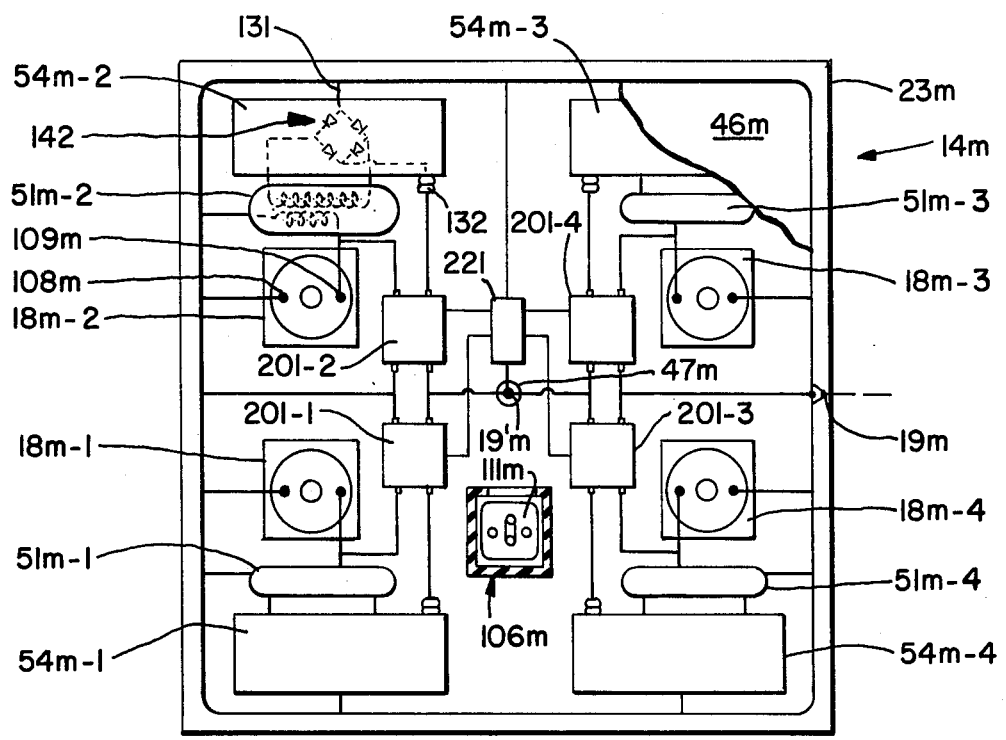
FIG _ 13
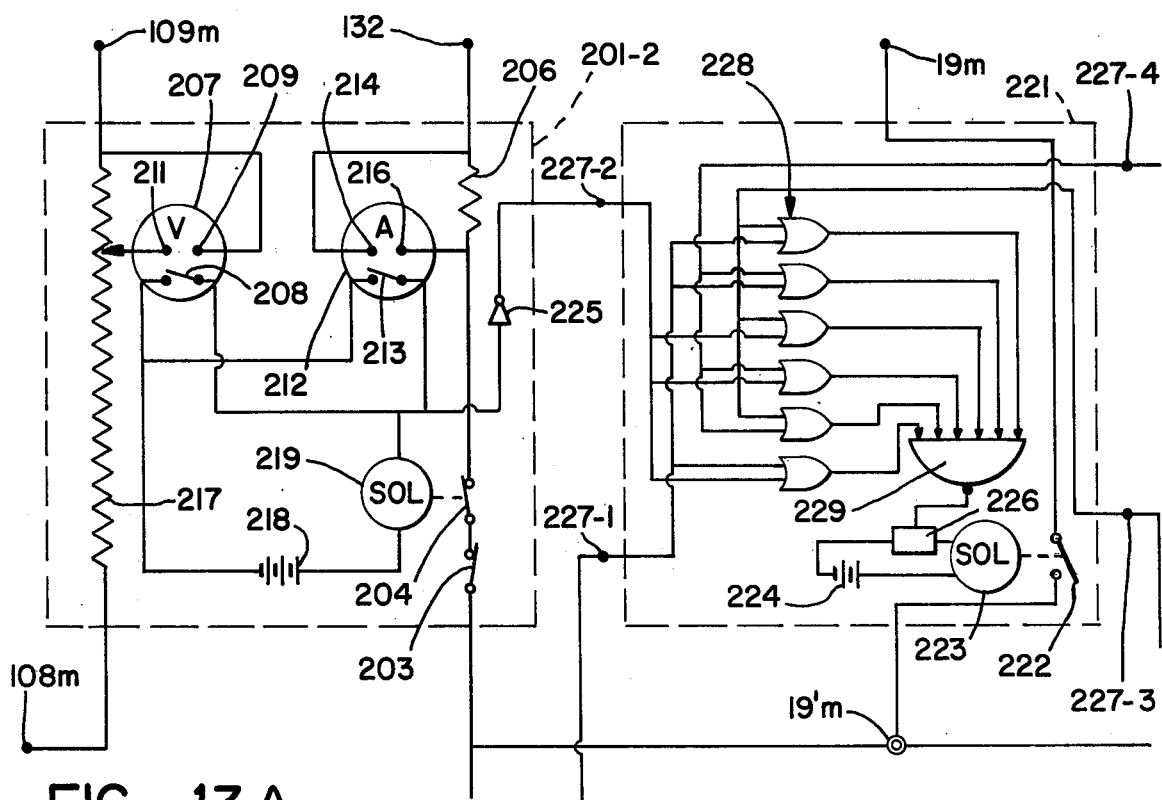
FIG _ 13A

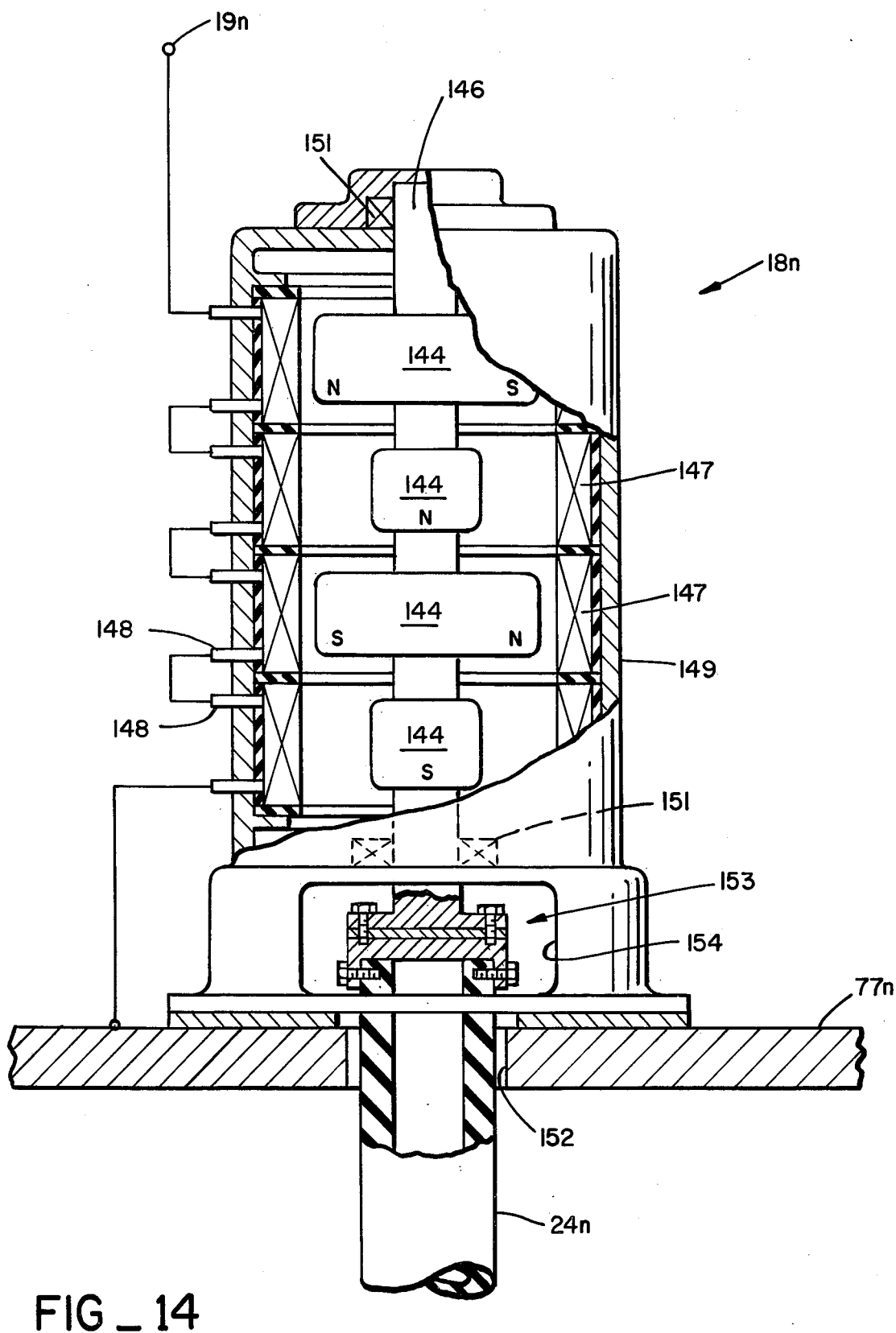
FIG_14

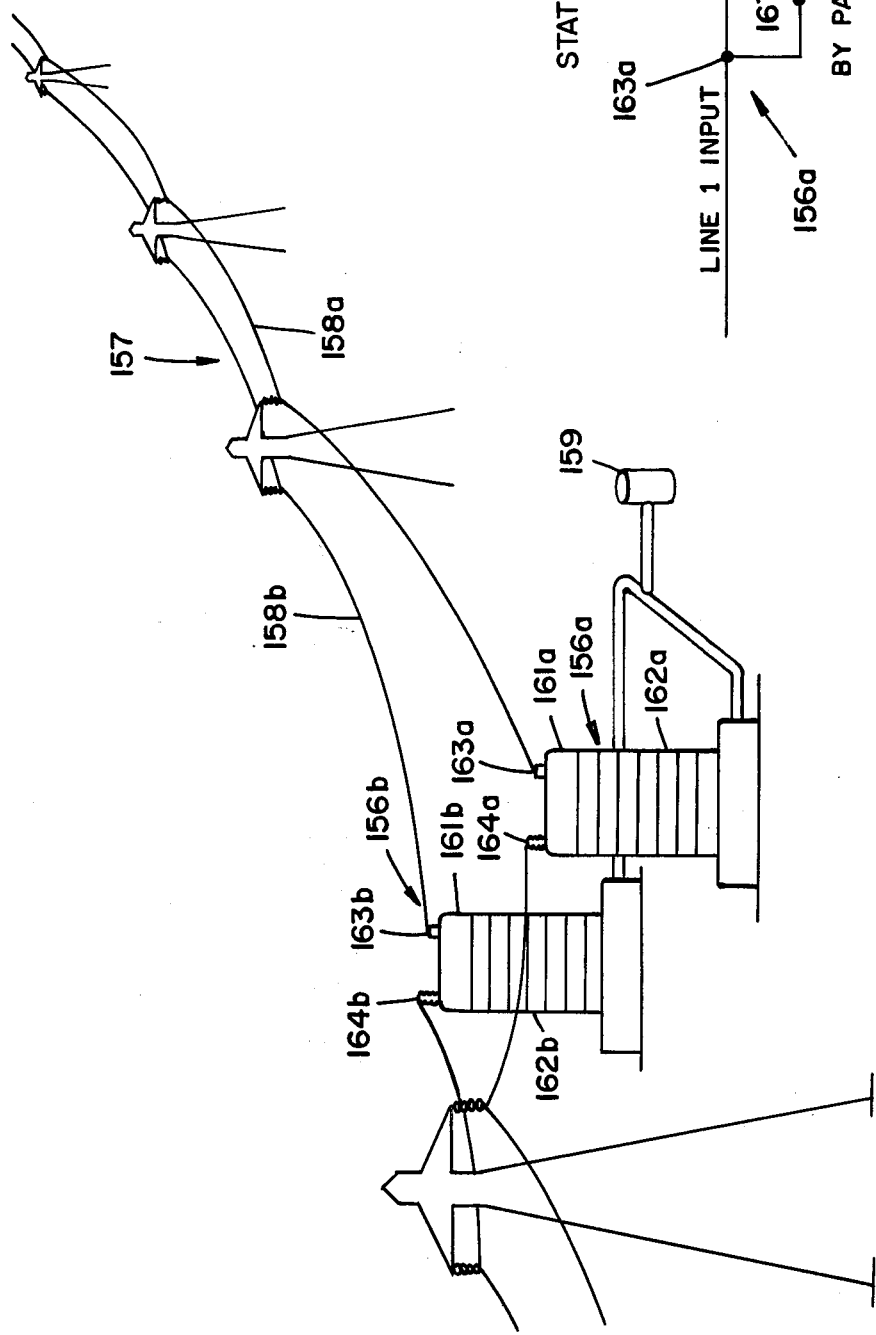
FIG_15
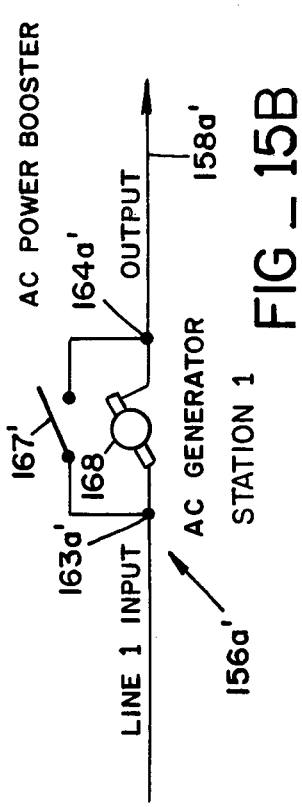
FIG_15A
FIG_15B

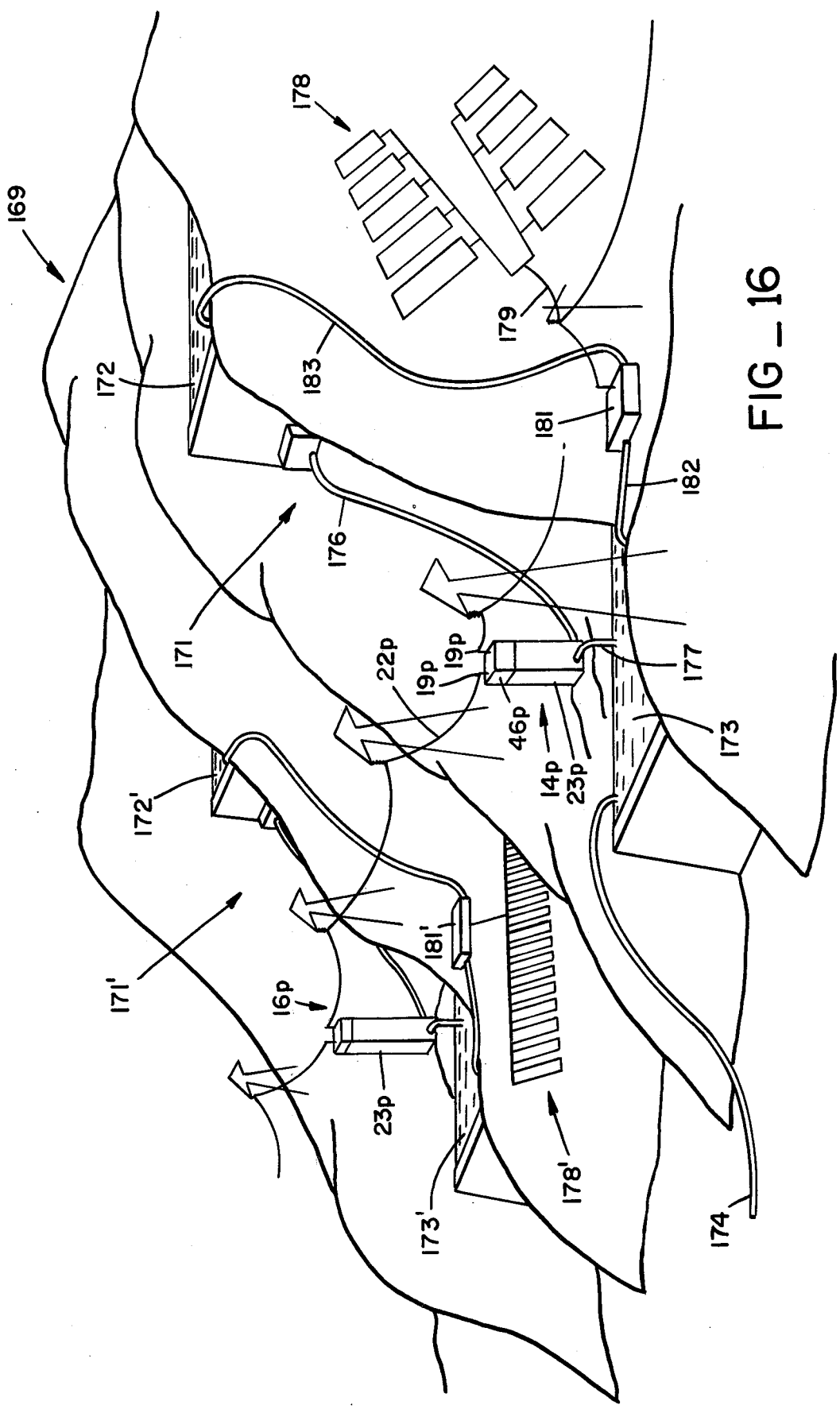

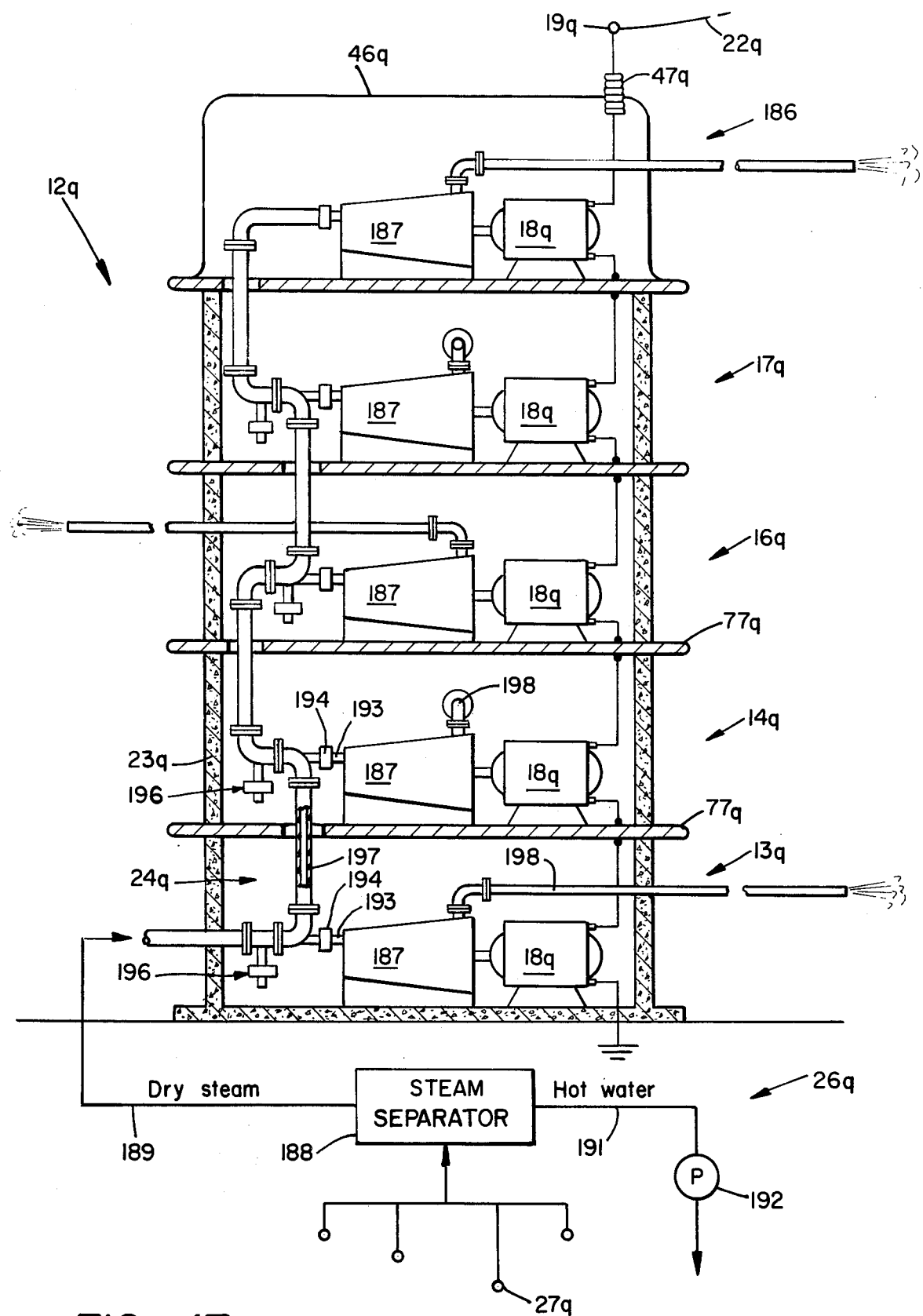
FIG_17

ELECTRICAL POWER GENERATION AND DISTRIBUTION SYSTEM

BACKGROUND OF THE INVENTION

This invention relates to systems for producing high voltage electrical power from fossil fuels or other non-electrical energy resources.

Electrical power generation plants have become larger as power consumption by industry and the public has increased. Where conventional power generation techniques are used, scaling up in size enables increased efficiency in the conversion of fuel energy to electrical energy and the unit cost of electric power is reduced. This gain in efficiency is largely confined to the generating station itself. Other external factors have recently arisen which greatly reduce any advantage which might be obtained by still further increases in generating station size.

The sources of fuels for operating power production plants are often remote from the power consuming area where the plant is located. Enormous quantities of coal, oil, gas, or the like must be transported long distances to supply large centralized generating stations. This is costly and inconvenient and requires an increasingly larger investment in railways, pipelines or the like. The fuel transportation operations are in fact more costly than appears at first consideration since less than one half of the thermal energy produced by burning fossil fuels in a large power plant is actually converted into electrical power. The remaining thermal energy must be disposed of. Thus, more than one half of the total fuel transportation cost is, in effect, wasted.

Another factor which inhibits the construction of still larger power plants near urban areas is the recent increased concern over adverse environmental effects which may occur at conventional power generating stations. In most cases, large quantities of combustion products and residual thermal energy must be disposed of in some manner. Apparatus for minimizing the release of pollutants and for reducing other undesirable environmental effects is costly and in many cases cannot be fully effective. Difficulties from environmental concerns are by no means confined to the generating station itself but arise also from fuel transportation facilities, such as pipelines, which are a necessary accompaniment of conventional power generation systems.

The problems discussed above can be greatly reduced by locating power plants near the mines, wells or other primary energy sources which are often situated in geographically remote regions away from the large urban areas where power is consumed. In the Western United States of America, for example, there are great reserves of coal, oil shale, tar sands, geothermal energy and the like situated in sparsely populated remote regions. While there have been instances where power generating facilities have been located at primary energy sources, notably in connection with hydro-electric facilities, there are several considerations which have heretofore tended to inhibit the location of power plants at fuel resource sites.

The investment required for a massive power generating station located at a remote mine, oil field or the like can only be justified if the fuel reserves in the immediate area are extremely large and will not be exhausted during the life of the plant. Concentrations of fossil fuels justifying this investment are relatively scarce, and it is much more common to find reserves of energy resources distributed over a broad area and not in concentrations which would justify a massive permanent power plant. In connection with certain forms of energy resources, even fairly concentrated sources may not be suitable for supplying a centralized massive power plant. Geothermal steam, for example, can only be moved for short distances through pipelines because of heat losses.

Another factor which has inhibited the location of power plants at fuel resource sites is the limitations of existing high voltage transmission lines. In general, transmission line losses are reduced by operating at higher voltages but a practical limit has been reached in raising voltages using conventional technology.

If alternating current is utilized, as is the case with most existing utility systems, massive extremely costly transformers are required to couple power generators to the high voltage line at the production end of the system and to step down the voltage at the distribution end. To reduce capacitive losses where voltage is raised, transmission lines must be suspended high above the ground. In addition, phase synchronization between generating stations connected to the same line is costly and imposes technical problems.

It has heretofore been proposed to reduce these power collection, transmission and distribution problems by converting to DC power transmission systems. DC systems have not been extensively used in part because of the cost and technical problems involved in converting high voltage DC power to low voltage AC power at the distribution end of the system. Further, use of DC transmission lines does not eliminate the need for costly massive transformers if conventional techniques are relied upon. Most DC power producing devices, whether generators, fuel cells, magnetohydrodynamic devices or others, do not produce very high DC voltages insofar as a single unit is concerned and it has not usually been practical to couple such devices directly to a high voltage DC power transmission line. The output of the DC generator or other DC power production device can be caused to drive an AC generator to produce AC power which may be stepped up in voltage by a transformer for coupling to the DC transmission line through a rectifier but this seemingly makes massive costly high voltage transformers necessary even in a DC power transmission system if conventional techniques are employed.

SUMMARY OF THE INVENTION

This invention provides an electrical power production system and a distribution system with which it is practical and economically feasible to locate power production facilities near fuel resource sites or other primary energy sources that may be remote from the areas in which the power is consumed. The system also makes it practical to produce large quantities of electrical power from a series of scattered, relatively small generating stations, each served by a relatively small remote fuel well, mine or the like. Among other advantages, there is no requirement for costly, massive high voltage transformers in either an AC or DC power transmission system.

In a typical system embodying the invention, a plurality of relatively small generating stations are provided and if necessary the stations may be located at widely separated geographical sites in order to be near primary fuel sources such as oil or natural gas wells, coal mines, geothermal energy wells or the like. Rather than employing a massive high voltage transformer at each station in order to couple to a high voltage transmission line, the several stations are connected together in series so that the cumulative small voltages provided by the stations can be additively applied to the transmission line. Each individual station contributes an increment of voltage to establish the desired high voltage at the long distance transmission line.

It is not practical to connect stations in this manner by simply connecting the terminals of several conventional generating stations in series as each station in the series must operate at a progressively higher basic voltage level. The internal insulation capabilities of generators or other power production devices and conventional supports and drive means therefor are insufficient to avoid arcing to ground, insulator breakdown and like problems. In order to successfully accomplish the series connection of several individual stations, the electrical power production devices of successive stations of the present invention are supported by an insulative structure which in a preferred form of the invention is of progressively greater height at each station in the series. The electrical power production devices at each station are then driven or supplied with fuel through insulative means. If the power production devices are AC or DC generators, for example, an insulative drive shaft or the like may extend upwardly to the device from a prime mover such as an engine, turbine, or electrical motor, which is itself at ground potential, and which is preferably fueled from adjacent resource sites. If the electrical power production devices are fuel-consuming components, such as fuel cells, magnetohydrodynamic devices, or engines driving generators, fuel is supplied to the devices through conduits formed of insulative material.

At the distribution end of the transmission line, the high voltage may be converted to relative low voltage AC power for existing utility systems by known techniques if desired, but these also tend to be undesirably costly. Preferably principles of the present invention are also used at the distribution end. A series of distribution stations are provided, each of which has an electrical motor or motors supported on insulative structure which is preferably of progressively diminishing height at each successive station. The motors of the several distribution stations are also electrically connected in series to operate at progressively lower voltage levels. At each station the motor operates an AC power generator situated at ground potential which produces the desired relatively low voltage AC power for existing utility systems, the motors being drivingly coupled to the generators through insulative means such as a long, non-conductive drive shaft.

While the invention has particular advantages for collecting and distributing electrical power produced at scattered, small sites of primary fuel resources, the techniques may also be employed advantageously at large power generation installations. In those cases, the several series connected stations may be closely spaced apart and connected by insulative access ramp structure, or may be stacked vertically within one or more high-rise structures formed at least in part of insulative material. In the case of vertically stacked stations, access to individual stations may be provided for by specialized elevators in which components extending between floors or stations are formed in part of non-conductive material.

Components of the system may be advantageously employed within the context of existing conventional power systems under certain circumstances. For example, if an existing high voltage transmission line passes near some energy source, such as a geothermal well for example, power stations of the form described above may be series connected into the transmission line to function as power boosters which compensate for line losses. Such a station may consist of an AC or DC generation device, according to the nature of the transmission line, supported on an insulative platform and driven or fueled through insulative means situated at or near the base of the platform.

Accordingly it is an object of this invention to provide a more economical system for producing electrical power.

It is an object of this invention to make practical the production of electrical power at sites adjacent primary fuel or energy resources which sites may be remote from the power-consuming areas.

It is another object of the invention to provide practical economical means for producing high voltage electrical power from small power plants located at scattered geographical sites.

It is still another object of this invention to reduce or eliminate the requirement for massive, costly, step-up and step-down transformers in conjunction with high voltage cross-country transmission lines.

It is still another object of this invention to provide less costly means for reducing very high voltage electrical power to relatively low voltages suitable for distribution to electrical utility systems.

It is still another object of this invention to reduce the need for long distance transportation of fuels and to alleviate environmental problems associated with the generation of electrical power.

The invention, together with further objects and advantages thereof, will best be understood by reference to the following description of preferred embodiments taken in conjunction with the accompanying drawings.

BRIEF DESCRIPTION OF THE DRAWINGS

In the accompanying drawings:

FIG. 7 illustrates a series of component stations for a power production system as arranged in vertically spaced relationship within a single supportive structure, FIG. 8 illustrates another example of a multistation structure, FIG. 9 is a perspective view illustrating different ways in which component stations of the power system may be arranged and illustrating an advantageous mode of electrical interconnections between stations, FIG. 10 is a side elevation view of a multistation power generation facility embodying the invention, FIG. 11 is a plan view, partially in section, taken along staggered line 11—11 of FIG. 10, FIG. 12 is an elevation section view showing further structural detail of a generating station suitable for the system of FIG. 1 and having access means for the high voltage region of the station, FIG. 13 is a plan section view of a generating station which may be basically similar to that of FIG. 12 but which provides additional power generation capability, FIG. 13A is a schematic diagram showing an example of control circuits for the generating station of FIG. 13, FIG. 14 is an elevation section view through an AC generator particularly adapted for usage in certain of the generation stations of the present invention, FIG. 15 is a perspective view showing utilization of power generation stations in accordance with the invention as line booster means for high voltage transmission lines, FIG. 15A is an equivalent circuit diagram of the power booster stations of FIG. 15 as utilized in a DC power transmission line, while FIG. 15B is an equivalent circuit diagram of the power booster station as employed with an AC power transmission line, FIG. 16 is a perspective view of a portion of a power production system utilizing solar energy as a primary energy source and using hydro-electric facilities as an energy storage means, and FIG. 17 is an elevation section view of a single structure power production system using geothermal steam as a primary energy source.

DESCRIPTION OF THE PREFERRED EMBODIMENTS

Figure 1:
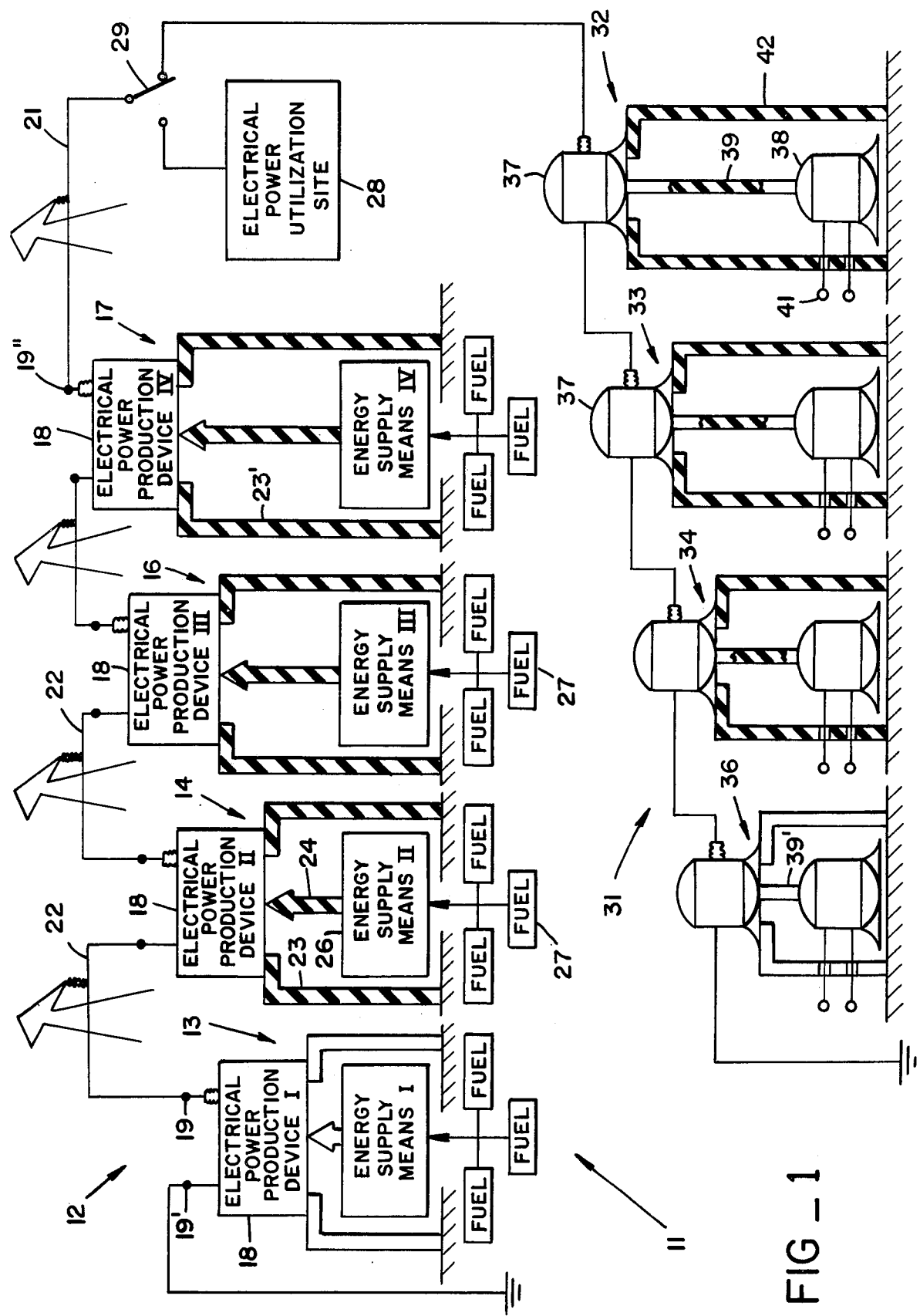
FIG. 1 is a diagrammatic view of an electrical power production and distribution system embodying basic aspects of the invention, FIGS. 2 to 6 diagrammatically depict examples of different forms of generating station which may be employed in the system of FIG. 1.

An electrical power production and distribution system in accordance with the invention may make use of a variety of different primary energy sources and may employ any of a number of different electrical power production devices, several specific examples of each being hereinafter described. FIG. 1 depicts a power production and distribution system 11 in a generalized diagrammatic form, in order to clarify certain basic aspects of the invention which are common to the various specific embodiments. While FIG. 1 depicts a complete system, including a plurality of power production stations and power distribution stations, certain of the components of the system have utility apart from the system as a whole, as will hereinafter be pointed out.

The power production portion 12 of the system is comprised of a plurality of generating stations of which four stations, 13, 14, 16 and 17, are depicted in FIG. 1 although in practice a larger number of stations will often be provided. Individual generating stations 13 to 17 may be situated at widely separated geographical sites or at one location, in a single structure in some instances, depending on the amount of fuel available at a particular location and other considerations to be discussed. Each such station has at least one electrical power production device 18 which in practice may be any of a number of different devices including but not limited to AC or DC electrical generators, fuel cells, magnetohydrodynamic devices or engine-generator sets. For simplicity of illustration and to avoid complicating the description of basic aspects of the invention, the power production devices 18 are depicted in FIG. 1 as being of the form having two terminals 19 such as are present on DC power production devices or on single phase AC devices, but it will be apparent that the invention is equally applicable to multi-terminal DC power production devices or multiphase AC power generators.

The power production devices 18 of the several generating stations are connected in series relationship to a high voltage transmission line 21. If the stations 13 to 17 are widely separated, an additional relatively short interstation transmission line 22 may be used to interconnect the terminals 19 of the several power production devices 18 for this purpose. For purposes of illustration, single conductor transmission lines 21 and 22 are depicted in FIG. 1 with one terminal 19' of the initial generating station 18 being grounded but it will be apparent that two conductor transmission lines may be employed if desired or in the case of multiphase AC power systems, multiple conductor transmission lines may be used.

With one terminal 19' of the initial station 13 grounded and one terminal 19" of the final station 17 connected to the high voltage transmission line 21, the power production devices 18 of the several stations must operate at progressively higher voltage levels. The initial station 13 may be at ground potential but the next station 14 must operate at a voltage level determined by the voltage produced by initial station 13 and adds thereto still another voltage increment to provide the base voltage level for the third station 16. Station 16 adds still another voltage increment which is the voltage base for the final station 17 which adds still another increment of voltage to produce the desired very high voltage on transmission line 21.

Because of the progressively higher voltages present at the power production devices 18 of the several stations, only one or at best a small number of the initial ones of such devices may be supported and operated in the conventional manner since the voltages at the successive ones of the stations are sufficiently high that arcing to ground or nearby structure, insulator breakdown and other undesirable effects would occur. Accordingly, successive ones of the stations, with the possible exception of one or more initial ones of the stations such as station 13 in this example, are supported on electrically insulative structures 23. To economize on cost, successive ones of the stations 14, 16 and 17 may be supported on progressively higher insulative structures 23 in accordance with the progressively higher voltages at the several stations although if the economies of modular and standardized construction offset the savings on materials and labor, then some or all stations may have the relatively high insulative support structure 23' required for the final station 17.

The insulative support structures 23 must be free of any electrically conductive connection to ground or to an adjacent conductive structure and a further complication is present in this connection. Except in the case of certain specialized power production devices such as elevated solar cells or wind driven generators for example, a majority of the power production devices 18 which may be used in the present system require an input of non-electrical energy through some tangible physical structure as such devices are essentially power transducers which convert non-electrical energy into electrical form.

The non-electrical energy input to devices 18 may be in the form of mechanical drive or kinetic energy where the devices 18 are generators for example or the energy input may be in the form of a liquid, gas or solid fuel if the devices 18 are fuel cells, magnetohydrodynamic devices or engine-generator sets for example. In either case, energy must be transferred to devices 18 through insulative means as indicated diagrammatically by arrows 24 in FIG. 1, which extend to the devices 18 from a non-electrical energy supply 26 which will generally be at ground potential. Energy supply means 24 may typically be a rotating drive shaft formed at least in part of insulative material if the devices 18 are of the type which are mechanically driven or may be fuel supply conduits also formed at least in part of insulative material where the devices 18 require a fuel input. As in the case of the support structure 23, the energy input means 24 may be of progressively increased length in the stations 14, 16 and 17 which operate at progressively higher voltage levels.

Although the initial station 13 or in some instances additional ones of the initial stations may have the same insulative support structure and insulative energy input means as the subsequent stations in the series, this may not always be necessary as the voltage at terminal 19 of the first station may not exceed the internal insulation capabilities of a conventional power production device 18.

The energy supply means 26 of the several stations may variously be engines, turbines or electrical motors, powered directly or indirectly from nearby fuel sources 27, or may be flow conduits or pumping stations supplying fuel to the devices 18 through insulative means 24, depending upon the nature of the specific power production devices 18. In those instances where fuel must be supplied to the devices 18 through insulative means 24, virtually any of the known hydrocarbon fuels such as oil, natural gas or gasified coal may be employed as such hydrocarbons are themselves excellent insulators from the electrical standpoint.

As a large number of the individual generating stations connected in series may provide very high voltages to the long distance transmission line 21, line losses are minimized.

The power delivered through transmission line 21 may be transmitted to conventional voltage step down and distribution means at the power utilization site as represented symbolically in FIG. 1 by a switch 29 for selectively connecting transmission line 21 to conventional power utilization facilities 28. The necessary conventional equipment for this purpose, including costly massive transformers, are subject to the problems heretofore discussed. It is preferable, in many instances, to apply the techniques of the present invention at the distribution end 31 of the system as well as at the production end. For this purpose, a series of distribution stations are provided of which four such stations 32, 33, 34 and 36 are depicted in FIG. 1. Each such distribution station has one or more electrical motors 37, which may be AC or DC motors depending on the form of power received through transmission lines 21, and the motor or motors of the several distribution stations are connected in series relationship between transmission lines 21 and ground. The several distribution stations may be situated in close proximity where the power transmitted through line 21 is to be consumed in one area or the distribution stations may be geographically scattered and located at different urban communities for example.

At each distribution station, the motor 37 drives one or more AC generators 38 through an electrically insulative drive shaft 39 to produce AC power at generator terminals 41 having a relatively low voltage compatible with that of the local utility system. Insulative belt drives or other drive transmitting devices may be employed in place of the rotary drive shafts 39. While the generators 38 are depicted as being of single phased form in FIG. 1 for simplicity of illustration, it will be apparent that the customary three phase AC power may be generated if desired. The operating motors 37 of the several distribution stations are electrically equivalent to a plurality of impedances series connected between transmission line 21 and ground, and thus the total voltage between the transmission line and ground is progressively reduced by an increment at each distribution station. Thus, the motors 37 of successive stations operate at progressively lower voltage levels. Except in the case of the final one or several final ones of the distribution stations, such as final station 36 in this example, these voltage levels exceed the internal insulation capabilities of the motors 37. To avoid arcing, insulator breakdown and the like, the motors 37 are supported in elevated positions above the ground by insulative supports 42. For similar reasons, the drive shafts 39 are formed at least in part of insulative material except that this may not be necessary in some instances in the case of the drive shaft 39' of the final station 36. Although the insulative supports 42 and insulative drive shafts 39 of the several distribution stations may all be of the same height if desired, it is usually preferable from a cost standpoint that the several stations be of progressively diminishing height with the highest station being the one directly connected to transmission line 21.

In contrast to conventional power systems, no massive costly step down transformers are needed to couple ech generating station and each distribution station to a very high voltage transmission line 21. A basic advantage of the system is that in many cases, the costs of constructing the insulative supports and insulative drive means is less than the cost of manufacturing, transporting, installing and maintaining the massive transformers required at conventional generating stations.

In FIG. 1 which depicts basic aspects of the system in generalized form, certain components have been shown in diagrammatic or symbolic form as these components may in practice be any of a variety of specific elements. Considering now typical specific examples of components for the individual generation stations, reference should be made initially to FIG. 2. FIG. 2 depicts one example of a power generating station 14a which may be employed where AC power is to be produced and where the primary energy source is one or more geothermal steam wells 43. The electrical power production device may be an AC generator 18a having terminals 19a L and 19a' connected in series with the associated interstation transmission line 22a and being supported in an elevated position on insulative structure 23a which may be a concrete tower having an internal chamber 44. In many cases, it will be desirable to protect the generator 18a with a weatherproof enclosure 46. Enclosure 46 may, if desired, be formed of conductive metal and in that event one of the generator power terminals 19a may be electrically connected to the enclosure while the other terminal 19a' is electrically isolated from the enclosure by an insulator 47.

The insulative drive shaft 24a, of which at least a portion is formed of high strength ceramic or plastics for example, extends downward from generator 18a to a turbine 26a disposed in chamber 44 and which is electrically at ground potential. A belt and pulley system or other drive transmitting means may also be used to drive generator 18a from turbine 26a provided such means does not involve an electrically conductive path to ground. Turbine 26a is a steam turbine in this instance although gas turbines and hydraulic turbines may also be used. Steam from wells 43 may be collected in a chamber 48 and transmitted to the intake of turbine of 26a through a suitable preferably thermally insulative conduit 49. If the station 14a is situated near industrial plants or near residential office or industrial buildings in some cases, exhaust steam from the turbine 26a may be utilized as a source of thermal energy for heating or for other purposes.

In some instances, the voltage step-up provided by the generators 18a of the several stations multiplied by the number of such stations may not equal the high voltage which it is desired to apply to transmission line 21. In this event, as depicted in FIG. 3, the AC generator 18b may be coupled to the primary winding of a voltage step-up transformer 51b, preferably contained within the generator enclosure 46b, and which has a secondary winding coupled to the station output terminals 19b and 19b'. In this manner, the voltage increment added to the interstation transmission line 22b by each individual station is increased so that the cumulative total at the final station is the desired cross country transmission line voltage. It has been previously pointed out that one important advantage of the invention is the elimination of a need for massive costly transformers for the purpose of coupling generators into high voltage transmission lines. In this connection, it should be noted that the voltage step-up transformer 51b utilized in the station of FIG. 3 need not be so massive or costly but may be of a relatively compact and economical form since it is not required that the relatively low voltage produced by the generator 18b be stepped up from ground level to match the high voltage on the cross country transmission line. Transformer 51b need have only a relatively small step-up ratio since the step-up ratios of all the plurality of generating stations in the system are additively combined, together with the voltage increments added by the several generators, in order to establish the desired high final line voltage.

FIG. 3 further illustrates another example of a primary fuel source. In particular, the insulative drive shaft 24b to generator 18b is driven by a gas turbine 26b receiving the output of a combustion chamber 27b which may itself be supplied with fuel from nearby natural gas wells 53 for example.

If the transmission line 21 is of the DC form, the output of step-up transformer 51b may be rectified. Referring now to FIG. 4 which depicts one example of a DC generating station, the secondary winding of the step-up transformer 51c may be coupled to the station output terminals 19c and 19c' through a rectifier 54 or other AC to DC converter of known form. FIG. 4 also illustrates still another example of a primary energy source. The non-electrical energy supply may be one or more diesel engines 26c driving the insulated drive shaft 24c through suitable gearing 56 and operated with fuel from a tank 57 preferably supplied with diesel oil from a nearby refinery 58 situated near petroleum wells 59 in the vicinity of the generating station.

Other specific components may also be utilized to provide DC power to the transmission line. Referring now to FIG. 5, the generators 18d supported on insulative towers 23d and driven through insulative drive shafts 24d, may be of the DC form in which case the generator output terminals 19d and 19d' may be connected directly in series with the interstation transmission line 22d. FIG. 5 illustrates still another example of a primary energy source and generator drive means. Specifically, insulative drive shaft 24d may be turned by a DC electrical motor 26d powered from fuel cells 61. As is known in the art, fuel cells may be adapted to produce DC electrical current from any of a number of liquid or gaseous fuels. In this particular example, where the station 14d is situated in a region of coal amines 62, the coal is gasified preferably at a mine mouth plant 63 and then stored in a suitable tank 64 which may supply the fuel cell assembly 61. If desired, the tank 64 and the fuel cell assembly 61 as well may be mounted on wheels for convenient transport although permanent installations and pipelines may also be utilized. The use of portable apparatus facilitates maintenance and replacement of components and enables such components to be re-used in the event that the primary fuel resource 62 in a particular area should be exhausted.

In the examples of individual generating stations described above, the generators which constitute the electrical power production devices are all mechanically driven by some form of prime mover operated at or near ground potential and coupled to the generator through an insulative drive shaft although it will be apparent that other mechanical drive means, such as insulative belt systems, may be used. However, the means for transmitting non-electrical energy to the electrical power production device is not necessarily a mechanical means in all cases. The energy which is transmitted to the high voltage region of the generating stations through insulative means need not necessarily be kinetic energy but may for example be chemical energy. Referring now to FIG. 6 an example of such a generating station is depicted wherein the generator 18e mounted on insulative supports 23e and series connected into interstation transmission line 22e through terminals 19e is operated by a prime mover which is a gasoline engine 66 in this example that is itself located within the high voltage region. Engine 66 in this example is disposed adjacent the generator 18e within conductive enclosure 46e and is drivingly coupled to the generator by a drive shaft 67 which need not necessarily be formed of insulative material.

The means for supplying non-electrical energy to the high voltage region in this example is a pump 26e which may be at ground potential and which supplies gasoline from a tank 27e to engine 66 through a fuel supply conduit 24e. Conduit 24e is formed at least in part of insulative material and extends upward within the chamber 44e of insulative support structure 23e. Since gasoline, like many other engine fuels, is itself a good insulator, there is no conductive path to ground from the high voltage region of station 14e.

In the several examples described above, the electrical power production device is either an AC or DC generator which must be mechanically driven. Also, the examples described above are individual generating stations which may be distant from each other in order to facilitate the collection of energy from scattered small energy resource sites. However, in some instances the basic concepts of the invention may be applied to systems which use electrical power production devices other than mechanically driven generators. Similarly, the basic concepts of the invention may also be utilized at areas where there is a sufficient concentration of resource fuels that two or more of the individual generating stations may be combined into a single structure.

FIG. 7 illustrates another example of the invention which uses fuel cell assemblies 18f as the electrical power production devices and wherein at least several of the generating stations of the system are vertically stacked within a single high rise building structure 68.

The power generation facility depicted in FIG. 7 produces high voltage DC power at an output terminal 69 situated at the top of building 68 and in this example includes six individual series connected generating stations 71 to 76 which are vertically spaced within building 68 with station 71 being lowermost and station 76 being uppermost. A base platform for each station is defined by a separate one of a series of seven vertically spaced apart horizontal platforms 77 which may be formed of conductive material such as steel and which are supported in their vertically spaced relationship by insulative walls 78 that extend between platforms 77 and preferably form an enclosure room for each station. As the stations operate at progressively higher voltage levels from the bottom to the top of the structure, corona discharge problems may be minimized by extending the ends of the platforms 77, with the exception of the lowermost or grounded platform 77', a small distance outwardly from the insulative sidewalls 78 and by rounding the outer edges and corners of the platform. A fuel cell assembly 18f is disposed at each station and is supported on the underlying platform 77. One terminal 79 of each fuel cell assembly is electrically connected to the underlying conductive platform 77 while the other terminal 81 is connected to the next higher platform 77, the other terminal of the uppermost fuel cell assembly being connected to high voltage DC output terminal 69 through an insulator 82. Thus, the several fuel cells assemblies 18f are in effect connected in series between ground and high voltage terminal 69 and the cross-country high voltage transmission line 21f may be connected to terminal 69 for transmitting electrical power to a distant utilization site.

Fuel cell assemblies 18f may be operated from any of a variety of liquid or gaseous fuels and in the present example utilize natural gas from a nearby storage tank 83 preferably supplied by a system of natural gas wells 27f near which the generating facility is located. To transmit fuel from the storage tank 83 to the several fuel cell assemblies 18f, an insulative pipe 84 extends from storage tank 83 into the lowermost station of high rise structure 68 and then extends upwardly therein through the several platforms 77. Small supply conduits 86 connect each individual fuel cell assembly 18f with the fuel supply pipe 84.

While the generating facility of FIG. 7 has been described as utilizing fuel cell assemblies 18f, there are other devices known in the art which also produce DC voltages from an input of liquid or gaseous fuel. The fuel cell assemblies 18f of FIG. 7 may, for example, be replaced with magnetohydrodynamic power generation devices of known form, the arrangement being otherwise essentially similar to that described above except insofar as such devices require a heated fuel and thus a combustion chamber must be provided between storage tank 83 and fuel conduit 84. Fuel cells and magnetohydrodynamic devices produce relatively low DC voltages in an individual unit, and thus the assemblies 18f of FIG. 7 should include a large number of individual fuel cells or the like connected in series relationship and in practice it will usually be desirable to employ a larger number of stations than are depicted in FIG. 7 in order to produce the desired high voltage at output terminal 69. However, there are alternate means for producing a desirably high output voltage with a limited number of vertically stacked stations, one such system being depicted in FIG. 8. In particular, the direct current-producing devices 18g at each station, which are magnetohydrodynamic devices provided with hot gaseous fuel through the supply pipe 84g in this example, are not directly connected together. Instead, devices 18g are electrically coupled to DC motors 87 at each station. DC motors 87 mechanically drive generators 88 at each station which are capable of producing a considerably larger voltage than is produced directly by the magnetohydrodynamic devices 18g or fuel cells or the like. The generators 88, which may be either AC or DC, each have one output terminal 79g electrically connected to the underlying conductive platform 77g and have the ohter output terminal 81g connected to the next higher platform 77g so that the generators are effectively connected in series to produce the desired high voltage. The structure of the generating facility of FIG. 8 may otherwise be similar to that previously described with reference to FIG. 7.

While several specific examples of component generating stations of the system have been described above, it should be understood that other combinations of electrical power production devices and non-electrical energy supply means and other primary fuel sources or energy sources may also be utilized. Further, while the several individual stations described above have been depicted and described as utilizing only a single generator, fuel cell assembly or the like and a single insulative drive means or fuel supply means therefor, it will be apparent that each station may utilize a plurality of such means with the plurality of electrical power producing devices in any single station being connected together in series relationship or in parallel or in series parallel relationship, depending on the output voltages of the particular devices with reference to the number thereof and the total number of stations. Further, while the system has been described to this point as utilizing a single conductor transmission line with ground return, with all individual generating stations being connected in series, variations of the system are also possible utilizing multiconductor transmission lines and wherein groups of stations are connected in parallel with the several groups themselves being connected in series to obtain the desired voltage step-up. A two-conductor DC power generation facility embodying certain of these modifications is depicted in FIG. 9.

In the system of FIG. 9 the initial group of generating stations includes six stations 18h which may be of any of the hereinbefore described forms suitable for producing DC output power at a pair of output terminals 19h and 19h' and which in this particular example are of the form utilizing geothermal steam wells 43h as the primary energy source. Output terminals 19h are the negative terminals in this example, and output terminals 19h' are the positive terminals. The six stations 18h are coupled to a two-conductor interstation transmission line 22h with three of the stations being connected in parallel between ground and one conductor 89 of the interstation transmission line while the other three stations of the group are connected in parallel between ground and the other conductor 91 of the transmission line but with reversed polarity. For this purpose all negative terminals 19h of the first three stations and all positive terminals 19h' of the second three stations are jointly connected together and grounded while the positive terminals 19h' of the first three stations are connected to transmission line conductor 89 and the negative terminals 19h of the other three stations are jointly connected to transmission line conductor 91. One advantage of this mode of station connection is that the voltage from either transmission line conductor 89 or 91 to ground is only one half of the total voltage provided through the transmission line when taken across to conductors 89 and 91. The stations 19h of the first group may operate at a ground potential level and thus need not be of specialized construction and do not require insulative supports and energy supply means.

Interstation transmission line 22h leads to a second group of six generating stations 14h which may be remote from stations 18h in order to draw upon another geothermal steam well field 43h-1 as a primary energy source. As the second group of stations 14h operate at a potential above that of ground, the individual stations are of the form having insulative support structures 23h. The positive terminals 19h' of three of the six stations 14h are connected to the negative voltage conductor 91 of the intersection transmission line 22h while the negative terminals 19h of the same three stations are connected to the negative conductor 91-2 of a second interstation voltage transmission line 22h-2. The positive conductor 89 of interstation transmission line 22h connects with the negative terminals 19h of the remaining three stations 14h of the second group and the positive terminals 19h' connect with the other conductor 89-2 of the second interstation transmission line 22h-2.

Accordingly, the positive and negative DC potentials on the two conductors of interstation transmission line 22h-2 are doubled relative to the corresponding potentials on the first interstation transmission line 22b although at each group of stations, power has been collected from individual stations which are connected in parallel.

Interstation transmission line 22h-2 leads to still a third group of six individual stations 16h. As the third group of stations must operate at still higher voltage levels, the insulative support structures 23h of the individual stations of the third group are appropriately higher than the insulative support structures of the second group of stations.

The stations of the first two groups are depicted in FIG. 9 in spaced apart columnar arrangements which is often convenient where all stations draw on a concentrated large primary energy source. However, it is not essential that the individual stations in each group be in close proximity or in some orderly geometrical arrangement. The individual stations comprising a group may be scattered and at various oreintations as depicted in the third group of stations 16h if the primary energy source is itself geographically. Thus the stations 16h of the third group are depicted as being distributed in an arrangement where each individual station is in proximity to a relatively small geothermal steam well 43h-2 which supplies an individual one of the stations or in some cases a pair or more of these stations depending on the capacity of the well. However, the electrical connections to the third group of stations are similar to those at the second group. Thus, three of the six stations 16h have positive terminals 19h' connected to the end of the negative conductor 91-2 of interstation transmission line 22h-2 while the negative terminals 19h at the same three stations are connected in parallel to the negative conductor 91-3 of the two conductor high voltage cross country transmission line 21h. Similarly, the positive conductor 89-2 of interstation transmission line 22h-2 connects to the negative terminals 19h of each of the three other stations 16h and the positive terminals 19h' thereof each connect with the positive conductor 89-3 of the cross country high voltage transmission line 21h. In order to interconnect the scattered individual stations 16h of a single group in parallel in this manner, it may be necessary to employ additional transmission lines 92.

It will be apparent that still additional groups of stations can be coupled into transmission line 21h to step-up voltage still further within the limits of the ability of the transmission line to carry high voltage. Power carried by the cross country transmission line 21h can be increased still further by connecting additional groups of stations into the line in parallel with the above described groups so that current delivered by the line to a distant utilization site is increased without raising the voltage still further beyond the capacity of the line. Further, while the series parallel groups of generating stations as depicted in FIG. 9 were described as utilizing geothermal steam wells as the primary energy source, it will be apparent that many other forms of primary energy sources may be utilized by substituting appropriate ones of the different forms of generating stations hereinbefore described.

In those instances where the series connected individual generating stations may be in close proximity to each other because of the preference of a sizeable fuel source, cost and operational economics may be realized by utilizing certain advantages dispositions of the stations relative to each other that simplify access, the supplying of fuel and maintenance operations. One example of such in multi-station assembly is depicted in FIGS. 10 and 11 in conjunction.

In this example, five stations 13j, 14j, 16j, 17j and 93j which operate at progressively higher voltage levels are connected in series between ground and a conductor 21j of a cross country high voltage transmission line 94 which transmits power to a distant utilization site. The five stations are spaced apart in a column and each has the metal enclosure 46j of the high voltage region supported on insulative support structure 23j with the insulative support structures being of progressively greater height. The stations 13j, 14j, 16j, 17j and 93j are spaced along a down sloping surface 95 in order that the enclosures 46j of all stations may be at the same elevation but still be supported on progressively higher insulative structures 23j. Each enclosure 46j has a smaller area than that of the associated insulative support 23j thereby providing a platform 96 on the top surface of each insulative support structure 23j at one side of the associated enclosure 46j, the platforms all being at the same elevation. Level walkways or driveways 97 extend between the platforms 96 of each successive pair of stations and are formed, at least in part, of electrically insulative material. Thus the platforms 96 in conjunction with walkways 97 provide a safe level access route to each of these stations. The spacing between successive stations preferably exceeds the reach of workmen by a substantial amount so that a person may pass from one station to the next higher voltage station without a risk of injury or death from an electrical discharge therebetween. In large installations where it may be desirable to drive maintenance vehicles along the access structure, the spacing between stations should substantially exceed the maximum length of the vehicles to be used.

The high voltage output conductor 22j is brought out of the metal enclosure 46j of the station through an insulator 47j and is connected to the metal enclosure 46j of the next higher voltage station, the metal enclosure 46j of the lowest voltage station being grounded and the output conductor from the final highest voltage station being connected to a cross country transmission line conductor 21j.

The electrical power generating devices within the individual stations of FIGS. 10 and 11 may be of any of the forms hereinbefore described, and in this example consist of fuel cell assemblies 98 at each station connected in parallel to a DC electrical motor 99 which drives an AC generator 101 capable of producing a higher voltage than is available from the fuel cells and having an output connected to the high voltage output conductor 22j of the station through a rectifier assembly 102 as the stations couple to a DC transmission line in this particular instance. Fuel cell assemblies 98 receive fuel through an insulative pipe 103 which extends horizontally through each of the five stations to connect with the fuel cell assemblies of each thereof. As shown in FIG. 10 in particular, insulative pipe 103 may extend from the low voltage station 13j to a suitable fuel source such as a natural gas storage tank 104 preferably supplied from nearby natural gas sources.

In order to best illustrate basic components of the invention, the several forms of generating stations herein before described have been depicted as utilizing a single electrical power production device and a single means for transmitting non-electrical energy thereto through insulative structure. Provisions for safe access to the high voltage regions have not been described except with reference to the particular station arrangement of FIGS. 10 and 11. In practice, it may often be advantageous to employ several electrical power production devices and several energy supply means in an individual station and the devices may be electrically connected in parallel or in series depending on the voltage generated by the individual devices in relation to the number of stations and the final desired voltage on the cross country transmission line. Referring now to FIG. 12, there is shown a more detailed view of a typical individual generating station wherein a pair of electrical power production devices 18k-1 and 18k-2 are provided in the single station 14k and safe access means 106' for the high voltage region is also shown.

The conducting metal enclosure 46k for the high voltage region may be of rectangular form and is situated at the top of insulative support structure 23k which may be a rectangular building formed of low conductivity concrete or other insulative material having the necessary load sustaining capacity. Vertically spaced horizontal conductive floors 77k may be situated in the building 23k and preferably have edges which extend a short distance outwardly therefrom and which are rounded to inhibit corona discharge. High voltage region enclosure 46k is disposed upon the uppermost floor 77k.

The electrical power production devices in this example are mechanically driven rotary AC generators 18k-1 and 18k-2 disposed on the uppermost floor 77k within enclosure 46k with the rotary axes of the generators being vertical. The means for driving the generators 18k are DC delectrical motors 26k-1 and 26k-2 disposed on the lowermost floor of structure 23k with the rotary axis of each motor being co-extensive with that of the associated one of the generators. DC current to drive motors 26k is supplied to conductors 107 which extend to a nearby source of direct current such as fuel cells 27k which are preferably fueled from sources located in the vicinity of the station 14k.

To supply non-electrical driving energy to generators 18k through insulative means, a drive shaft 24k-1 extends upwardly from motor 26k-1 to generator 18k-1 and a similar drive shaft 24k-2 extends upwardly from motor 26k-2 to generator 18k-2, both such drive shafts being formed of insulative material at least along a portion of the length thereof sufficient to avoid establishing a conductive path to ground from the high voltage region. It will be apparent that if the power output of the motors exceeds that required to drive an individual generator, a single one of the shafts may drive a plurality of generators within the high voltage region.

The high voltage input line 22ki from the preceding lower voltage station is electrically coupled to the enclosure 46k and one terminal of each generator is also electrically coupled to the enclosure 46k. The other terminals 109 of each generator are jointly connected to the transmission line conductor 220ko, leading to the next higher voltage station, through an insulator 47k which extends through the enclosure 46k. Thus, in this example, the two generators 18k are connected in parallel within the station, but the generators can be connected in series if it is desired that the stations produce a higher voltage step up. Also, this example is a station for supplying an AC transmission line but if the station is to be coupled to a DC transmission line, rectifiers may be situated within the enclosure 46k and may be electrically connected between the generators and the transmission line in the manner hereinbefore described.

Considering now suitable provisions for safe access to the high voltage region of station 14k, the lowermost level of structure 23k is at ground potential and the lower portion of the structure may simply be provided with conventional access means such as doors 110. Access means leading to the high voltage region within enclosure 46k must be formed at least in part of insulative materials to avoid any conductive path to ground. While an insulative stairway can be provided if the distance between the high voltage region and the lower levels substantially exceeds the height of workmen and any load they might conceivably by carrying, such means may not be entirely adequate in that on occasion heavy equipment components may have to be transported to the high voltage region or lowered therefrom. Accordingly one access means in this example of the invention is an elevator 106' which must have a specialized construction wherein no component, including switch controls for operating the elevator, has any electrically conductive element extending from the high voltage region to ground.

The elevator 106' may have a shaft 106 formed of plastic or other insulative material extending upwardly from the ground level through the several floors 77k into the high voltage region enclosure 46k. A service gondola 111 of sufficient size to accommodate workmen and any equipment components which may have to be transported to or from the high voltage region is situated within shaft 106 for upward and downward movement therein. Gondola 111 may be formed of conductive material if the height of the gondola is substantially less than the vertical separation between floors 77k. The metallic gondola construction has advantages in that it is then in effect a Faraday cage shielding passengers from any external voltage differences in the vicinity of the gondola.

In order to raise and lower gondola 111, a motor 112, situated at the top of shaft 106 in this example, operates a hoist cable system 113 which may be conventional except insofar as the cables are formed of high strength insulative material such as braided glass fiber for example. Electrical power conductors cannot be extended upwardly to elevator motor 112 from ground level as this would provide a conductive path for high voltage. If the motor 122 is electrical, it may be operated from the output of the generators 18k within the high voltage region. In this example, motor 112 is an AC electrical motor of the form having a first terminal 114 which is connected to enclosure 46k and having a second terminal 116 which may be energized to produce motion in the first direction and a third terminal 117 which may be energized to produce motion in the opposite direction. To selectively energize either of terminals 116 or 117 depending on the direction of the elevator motion which is desired, a three-position switch 118 is connected to the output terminals 109 of generators 18k and has a normal centered position at which neither of elevator motor terminals 116 or 117 is energized. Switch 118 may be operated to connect motor terminal 116 with generator terminals 109 to initiate raising of the gondola 111 and may alternately be operated to connect elevator motor terminal 117 to generator terminals 109 to lower the gondola. Operation of the elevator control switch 118 itself presents unique problems in that conductors to control switches may not extend between the high voltage region and ground but the elevator operation must be able to control the switch from either location. Various remote control systems that do not require a direct electrical connection may be used for this purpose, sonic switch means and microwave signal operated switch means or the like being examples. In this instance, switch 118 is controlled by operating light sources 119 and 121, situated at the top surface of gondola 111, which may be actuated to cause upward and downward elevator motion respectively. Solenoid armatures 122v and 122d are mechanically coupled to opposite sides of switch 118 and are spring-biased to a centered position at which switch 118 does not energize either elevator motor terminal 116 and 117. Solenoid coils 123v and 123d are disposed coaxially around armatures 122v and 122d respectively so that energization of coil 123v operates switch 118 to energize motor 114 for upward elevator motion while energization of the other solenoid 123d operates the switch in an opposite direction to energize the elevator motor to lower the gondola 111. Solenoid 123v is connected to a battery 124 in series with a first normally open relay 126v while solenoid 123d is connected to the battery in series with a second normally open relay 126d. A first photo electric cell 127v is coupled to relay 126v to close the relay in response to ambient light received from light source 119 of the gondola 111. When relay 126v is closed in this manner solenoid 123v is energized and operates switch 118 to the position at which elevator motor 112 i energized to raise the gondola 111. The other relay 126d is controlled by a second photocell 127d which is oriented to respond to light from the other source 121 at gondola 111 to close relay 126d and thereby energize solenoid 123d. This in turn operates switch 118 to the position at which motor 112 lowers the gondola 111. Photocells 127v and 127d are thus situated at the top of shaft 106 in spaced apart relationship whereby each receives light from only one of the sources 119 and 121. If the height of the elevator shaft 106 is such that cross interference of the light beams from sources 119 and 121 cannot be avoided, then lasers emitting very narrow beams of coherent light may be utilized for the light sources.

Access may also be provided for by access ramps 130, formed of insulative material, which incline upwardly between each successive pair of floors and pass through openings 130' therein. In large installations with sufficient spacing between floors, ramps 130 may be designed to carry motorized load carrying vehicles.

While the station 14k depicted in FIG. 12 has been described as utilizing two AC generators to provide an AC output, larger numbers of generators may be desirable at each station and in some instances it may be desirable to step up the voltage output of each generator by transformers and to rectify the generator output for coupling to a DC transmission line. FIG. 13 illustrates a broken out plan view of the high voltage region of still another station 14m in which a larger number of generators are utilized together with voltage step up and rectification means and switch means whereby individual generators may be disconnected from the system for maintenance or repairs without stopping output of the station as a whole.

In the station 14m depicted in FIG. 13, four AC generators 18m-1, 18m-2, 18m-3 and 18m-4 are situated within the high voltage region enclosure 46m. Enclosure 46m may rest upon insulative support structure 23m similar to that previously described, and each of the generators may be driven through insulative means also similar to that previously described. An insulative elevator shaft 106m containing a service gondola 111m, similar to those previously described, may be provided for access to the high voltage region.

All four generators are connected in parallel between the transmission line input terminal 19m from the next lower voltage stage station and the output terminal 9'm at insulator 47m which connects to the next higher voltage level station. Thus, each generator may have one terminal 108m connected to the high voltage enclosure 46m to which the input terminal of station 19m is also connected while the other terminal 109m of each generator is connected to one primary winding terminal of an associated one of four step-up transformers 51m-1, 51m-2, 51m-3 and 51m-4. The other primary terminal of each transformer may be connected to the enclosure 46m. Each transformer has high voltage output terminals connected to the input of an associated individual one of four rectifier assemblies 54m-1, 54m-2, 54m-3 and 54m-4. Each rectifier assembly has one output terminal 131 connected to enclosure 46m with the other higher voltage terminal 132 being connected to the high voltage output terminal 19'm of the generating station through an associated one of four control circuit assemblies 201-1, 201-2, 201-3 and 201-4 which will be hereinafter described.

Transformers 51m may be of conventional construction and need not be massive and costly inasmuch as the voltage step-up which is required in each transformer is much less than would be necessary if the associated generator operated at ground potential but had to be coupled to a high voltage cross country transmission line. Rectifiers 54m may utilize diodes, thyristors or the like in known circuit configurations and accordingly, the internal circuit arrangement is depicted symbolically in FIG. 13 by a single diode bridge 142 although in practice a larger number of diodes would generally be required.

Although in a simplified installation, the output terminals 132 of the several rectifiers might be connected directly to station output terminal 19'm, it is desirable that any individual one of the parallel connected generators 18m be capable of being selectively decoupled from the system so that it may be shut down for maintenance or repairs while the remaining generators remain connected into the system. Because of the parallel connection of the several generators, such disconnection does not affect the voltage step-up provided by the station 14m as a whole, although power output is reduced. In addition, it is desirable that automatic means be provided to rapidly disconnect any individual one of the generators in the event of malfunction in order to avoid possible damage from heavy currents, arcing or the like. Control circuit assemblies 201 perform these functions.

Referring now to FIG. 13A, each such control circuit assembly, such as assembly 201-2, normally provides a conducting path between the associated rectifier terminal 132 and the station high voltage output terminal 19'm through a normally closed manual switch 203, a set of normally closed relay contacts 204 and a low value resistance 206.

Each control circuit assembly may typically have an AC voltmeter 207 of the form in which an internal switch 208 closes when the voltage impressed across a pair of voltmeter terminals 209 and 211 varies from a predetermined normal value. Similarly, circuit 201-2 may also have a current meter 212 of the form in which an internal switch 213 closes when the current transmitted through a pair of meter terminals 214 and 216 varies from a predetermined value. Voltmeter terminals 209 and 211 are connected across a small portion of a very high resistance 217 which is itself connected across the terminals 108m and 109m of the associated one of the generators. Thus, switch 208 of the voltmeter closes if the voltage produced by the associated generator deviates from a predetermined normal value. Current meter terminals 214 and 216 are connected across the previously described low value resistor 206 and thus switch 213 of the current meter closes if the current being produced by the associated generator, transformer and rectifier combination varies from a predetermined normal value. Thus, in the event of malfunction, the internal switch of one or both the voltmeter 207 and current meter 212 will close thereby detecting the condition.

The internal switches 208 and 213 of the voltmeter and the current meter are connected in parallel between a current source such as battery 218 and a relay driver coil 219. When energized by closing of one or both of switches 208 and 213, driver coil 219 opens relay contacts 204 thereby decoupling the associated generator transformer and rectifier from the station high voltage output terminal 19'm. The manual switch 203 may also be used for this purpose in the event of failure of the automatic fault detector system itself and also to assure that an inadvertent automatic reconnection to the output terminal does not occur while maintenance or repairs are in progress.

Referring now again to FIG. 13, it is desirable to disconnect individual ones of the generators 18m when necessary rather than disconnecting the entire generating station 14m from the system because of the series relationship of the several stations. Opening of the circuit through any individual station 14m as a whole would of course shut down the entire power generation system unless it is of the form in which one or more additional stations are connected in parallel at each stage. Shut down of a small proportion of the paralleled power production devices in a particular station can be tolerated since the slightly increased current load then imposed on the remaining operative power production devices is within the overload capabilities of most such forms of device. However, disconnection of a relatively large proportion of the power production devices 18 in a particular station may not be tolerable as a greatly increased current must then pass through the remaining operative devices. But as pointed out above, it is highly undesirable to simply open the entire circuit through a station 14m as this may shut down the entire generating system because of the series relationship of successive stations. In the example of FIG. 13, disconnection of two or more of the power production devices 18m, for maintenance or repairs or as a result of fault detection through the control circuit described above, requires that the other power production devices also be disconnected in order to avoid an intolerably high current load on each of the other devices as a result of the factors discussed above. In order to prevent an open circuit in the entire generating system when this occurs, a bypass switch asembly 221 is connected between the station input terminal 19m and station output terminal 19'm.

Referring again to FIG. 13A, bypass switch assembly 221 includes a normally open switch connected between the station terminals 19m and 19'm which switch in this example is a set of relay contacts 222. While contacts 222 might be a manually operated switch, it is preferable that very rapid automatic means be provided to close the contacts 222 whenever two or more of the power production devices of the stations have been disconnected from the output terminal 19'm either manually or by the automatic fault detection means hereinbefore described. For this purpose, contacts 222 are controlled by a relay driver coil 223 to which a battery 224 is connected through a normally open solid state switch device 226. Thus, the bypass power path through the station may be established when necessary by triggering solid state switch device 226 into conduction.

In order to trigger solid state switch device 226 for this purpose, means are provided which detect the presence of a fault signal from any two or more of the previously described control circuits 201 and which responds to this condition by triggering solid state switch 226 thereby closing the bypass relay contacts 222. Such means may be a suitable arrangement of logic circuit elements as depicted in FIG. 13A. Thus, bypass circuit 221 may have four fault signal input terminals 227-1, 227-2, 227-3 and 227-4, each connected through a signal inverter 225 to an individual one of the control circuits 201 at the junction between the internal switches 208 and 213 of the volmeter and current meter thereof and driver coil 219 thereof. Thus, each of the fault signal input terminals 227 is energized provided that the internal switches 208 and 213 of all control circuits are open. If either switch 208 or 213 of a particular control circuit 201 is closed, indicating a fault in the associated generator-rectifier combination, then the input of the associated inverter 225 is energized causing the output thereof and the associated fault signal terminal 227 to be de-energized.

In order to trigger solid state switch 226 any time that two or more of the fault signal input terminals 227 are de-energized, six OR gates 228 and a six input NAND gate 229 may be utilized, suitable constructions for such logic circuit elements being known to the art. With four fault signal input terminals 227, there are six possible different pairs of such terminals which may be de-energized simultaneously indicating a need to close bypass relay contacts 222. Accordingly, each OR gate 228 has a pair of inputs connected to a combination of the fault signal terminals 227 which is distinct from the pair of such terminals connected to each of the other OR gates. Thus, if all four fault signal inputs 227 are energized, the outputs of all six OR gates 228 are also energized. If any single one of the fault signal terminals 227 is de-energized, indicating a fault in only one generator, the outputs of all six OR gates remain energized since each OR gate has inputs from two different pulse signal terminals 227, one of which is still energized. However, if two or more of the fault signal terminals 227 should become de-energized, then the output of at least one of the OR gates 228, specifically the one having inputs coupled to those two terminals, will also be de-energized.

The output of each OR gate 228 is connected to an individual input of NAND gate 229 which is of the known form having an output that is unenergized as long as all inputs are energized, but which becomes energized if any one or more of the inputs are de-energized. Accordingly, the output of NAND gate 229 becomes energized if the output or any one or more of the OR gates 228 becomes de-energized as described above. This triggers solid state switch device 226 to close the station bypass relay contacts 222.

With regard to the switching components described above with reference to FIG. 13A, it is possible to employ switches and relays which are of economical and simple construction relative to what is required in a conventional power system. While the interstation transmission lines in the present invention may carry very high voltages at the level of hundreds of kilovolts, the voltage difference across the terminals of each individual station are much lower, typically at levels measured in tens of kilovolts, and thus switch requirements are not severe.

It has been pointed out that the generators used in certain embodiments of the present system may, if desired, be of conventional construction but in some instances there are advantages to utilizing a specialized generator construction of which an example is shown in FIG. 14. The generator construction of FIG. 14 may reduce the size of the step-up transformer needed within the high voltage region of the generating station or may eliminate any need for such transformers as higher output voltages can be obtained than in conventional generators. Where the generator supplies a DC transmission line through rectifiers as hereinbefore described, the construction of FIG. 14 has the advantage of reducing ripple in the DC output voltage. Basically, these advantages are realized by utilizing a plurality of rotors 144 distributed along the generator shaft 146 each turning within an associated individual stator winding 147. To obtain relatively high voltage output, the output terminals 148 of each stator winding are connected in series, in this instance between the conductive floor 77n of the high voltage region and the output terminal 19n of the generator station. To reduce ripple, the several rotors 144 are angularly oriented to be out of phase with each other preferably by equal angular increments. As there are four rotors and stators in this example, each successive rotor is oriented at an angle of 90° relative to the adjacent rotors. The rotors 144 in this example are permanent magnets which have the advantage of eliminating any need for commutators, brushes or the like but it will be apparent that wound, electrically energized rotors may be used if desired.

Stators 147 are disposed in spaced apart coaxial relationship within an upright cylindrical generator casing 149 which is supported upon floor 77n and which contains suitable bearings 151 for journalling the rotor shaft 146 along the axis of the casing. Insulative drive shaft 24n extends upwardly through a opening 152 in floor 77n and turns the generator rotor shaft through a disengageable coupling 153. An opening 154 is situated in the base of generator casing 149 to facilitate engagement and disengagement of the generator from drive shaft 24n.

It will be apparent that the generator may have a larger number of rotors 144 and stator windings 147 if desired. In a DC power generation system, where large numbers of generators 18n of this specialized construction are employed, phase and speed control circuits need not be present to synchronize the many generators since the output of each individual generator is itself relatively ripple-free and the combined residual ripples from the many generators tend to cancel each other out in the system as a whole.

The invention has been hereinbefore discussed as embodied in a complete power generation system operating on certain novel principles. It should be appreciated that certain aspects of the invention have application to use within otherwise conventional power systems. For example, as depicted in FIG. 15, generating stations 156a and 156b may be coupled into cross country power transmission lines 157, which may be part of a conventional power system, in series relationship with the conductors 158a and 158b. The stations then function as power boosters for compensating for transmission line losses. This is particularly useful where the transmission line 157 happens to pass near some natural source of energy such as an isolated geothermal steam well 159 in this example, although the stations may be operated from any of the primary energy sources hereinbefore discussed.

The internal construction of the booster stations 156 may be similar to any of the examples hereinbefore described depending on the nature of the primary energy source 159 and depending on whether transmission line 157 is of the AC or DC form. Thus, each such booster station will have a high voltage production region 161 supported on insulative structure 162 and supplied with non-electrical energy through insulative means as hereinbefore described. Transmission line conductor 158a connects with one terminal 163 of the associated booster station and continues from the other terminal 164 of the booster station. FIG. 15A diagrammatrically depicts the electrical equivalent circuit of one of the booster stations 156a in the case of a DC system. As therein illustrated, the booster stations may be regarded as the equivalent of a battery 166 series connected to the transmission line conductor. In order to provide for maintenance and repairs without disrupting power transmission, the high voltage region of the station may be provided with a normally open bypass switch 167 for directly connecting the station output terminals 163a and 164a when the station is to be shut down.

FIG. 15B is the equivalent circuit diagram of one of the booster stations 156a' if the associated transmission line conductor 158a' is part of an AC system. In this case the booster station 156a' may be regarded as the equivalent of an AC generator 168 series connected into the cross country transmission line conductor 158a' and forming, in effect, a portion thereof. As in the previous instance a bypass switch 167' may be connected between the terminals 163a' and 164a' of the station to enable to continue power transmissions when the booster station is shut down.

Referring now to FIG. 16, the examples of the invention hereinbefore described have relied upon fossil fuel resources or upon geothermal steam as the primary energy source and have directly consumed fuel or steam for conversion into electrical energy. The system may draw upon other energy sources and may do so indirectly. FIG. 16 depicts two stations 14p and 16p of a power generation system wherein the stations are basically hydroelectric but draw ultimately on solar energy which is inexhaustible. Although the efficiency of solar cells at the present state of technology is relatively low, compensating factors are the absence of fuel costs and relatively low maintenance costs. One problem associated with electrical power production from solar energy is the intermittent nature of the primary energy source. Power production occurs during the daylight hours whereas power consumption demand continues and in some cases increases during the night. The problem is resolved in the system of FIG. 16 by utilizing artificially created hydroelectric facilities as a temproary power storage medium.

The system of FIG. 16 is adaptable to a variety of regions but is ideally situated in a desert area where there are mountains 169 characterized by steep narrow-walled canyons 171 and preferably where there is a large urban area nearby. These conditions all obtain, for example, in the state of California near the city of Los Angeles. The large urban area is both a consumption site for the electrical power and also a source of waste water which may be utilized in the system of FIG. 16 with only minimal purification requirements.

To operate station 14p, upper and lower reservoirs 172 and 173, respectively, are constructed in a first canyon 171. Water to fill the reservoirs, if not available from natural sources, may be brought to the site through a pipeline 174 from the nearby urban area and may be storm drainage water, partially treated sewage water or may be derived from other sources which otherwise present a disposal problem.

Generating station 14p is situated near lower reservoir 173 and is of the turbine driven form hereinbefore described with a power production region 46p which may be of any of the several forms hereintofore described. Station 14p has terminals 19p connected in series with an interstation transmission line 22p also as previously described. A conduit 176 extends from the upper reservoir down to station 14p, to drive the turbine, and the water outlet conduit 177 from the station empties into the lower reservoir 173. The primary energy source is an array of solar cell panels 178 preferably disposed on a south or southwest facing slope if in the Northern Hemisphere and a low voltage DC conductor 179 transmits the output of the solar cell array to power a pumping station 181. Pumping station 181 has an intake pipe 182 drawing water from lower reservoir 173 and has an output pipe 183 extending upwardly to return water from the lower reservoir to the upper reservoir 172.

Power station 14p is, through intersection transmission line 22p, connected in series with additional generating stations of which one additional station 16p is shown. The additional stations may be similar to station 14p except insofar as the insulative support structures 23p of successive stations are of increasing height towards the high voltage output end of the system. Thus station 16p may also include upper and lower reservoirs 172' and 173', respectively, a pumping station 181' and solar cell array 178', arranged essentially as previously described.

In operation, solar energy is converted to DC electrical power by solar cell array 178 and is transmitted to pumping station 181 where the energy is then converted to potential hydraulic energy stored in the upper reservoir 172. Through the medium of pressurized water in conduit 176 such energy is transferred to station 14p where it is initially converted into mechanical energy by turbines and then to electrical energy for delivery through the transmission line. The upper reservoir 172 functions as an energy storage system whereby at least a portion of the energy developed during the daylight hours may be stored and then used to operate the generating station 14p during the hours of darkness. Water lost from the reservoirs 172 and 173 by evaporation or other causes may be replenished if necessary through pipeline 174.

In those instances where the power production system uses steam as the primary energy source, it is not always necessary to first convert the energy to mechanical form for delivery to the high voltage region through insulative drive shafts or the like. If the steam is sufficiently hot that a sizable amount of dry steam is available, it may be transmitted to turbines situated in the high voltage region as thoroughly dry stream, i.e., steam containing no appreciable amount of condensed water droplets, is itself a good electrical insulator.

Referring now to FIG. 17, a multi-station, single structure power production facility 12q which operates on this basis is depicted. A single building contains five power generating stations 13q, 14q, 16q, 17q and 186 in vertically spaced relationship and connected in series relationship between ground and a high voltage output terminal 19q to which a transmission line 22q may be connected. The building may be of the form previously described having conductive floors 77q at the base of each station supported by electrically insulative walls 23q which form a closed room for each station. Within each station at least one steam turbine 187 is drivingly coupled to at least one electrical generator 18q. Each generator 18q has output terminals connected between the subjacent conductive floor 77q and the next higher floor except that one terminal of the lowermost generator is grounded while the other terminal of the uppermost generator is connected to high voltage output terminal 19q through an insulator 47q mounted in the metal enclosure 46q of the uppermost station 186.

Steam for operating the turbines 187 may be artificially produced in boilers but in the present example steam is obtained from nearby geothermal wells 27q. As dry steam is required for operating the power production facility, it may be necessary to pass the steam through a separator 188 of the known form having a first outlet 189 for dry steam and another outlet 191 for hot water. In many cases geothermal well production can be better maintained by returning the hot water, which is frequently brine, to the underground region using a pump 192 if necessary.

Dry steam from separator outlet 189 is transmitted to the several turbines 187 through one or more conduits 24q which extend upward to the several stations. A single conduit 24q is used in this example and at each station a short branch conduit 193 transmits steam to the turbine 187 through a shut-off valve 194. A condensate trap and blow-off valve 196 may be provided within each station.

At least a section 197 of the steam conduit extending between each successive pair of stations is formed of electrically insulative material which is preferably a good thermal insulator as well, various known plastics, glasses, ceramics and the like being suitable for this purpose. If the thermal insulation capabilities of the conduit material are insufficient to prevent appreciable condensation, additional thermal insulation may be disposed around the conduit provided that it is not of a form which would create an electically conductive path between stations.

The steam discharge from turbines 187 must be released from the several stations and special provisions may be necessary since a concentration of wet or partially condensed steam in the vicinity of the building could cause an electrical discharge to ground or between stations. Accordingly, the discharge pipe 198 from the turbine at each station is formed of electrical insulator material and extends outwardly from the side of the building for distance sufficient to avoid excessive steam concentrations in the immediate region thereof. This can be more readily accomplished if the discharge pipes 198 at adjacent stations extend in different directions. In this example each discharge pipe 198 extends horizontally from the building along a path forming a ninety degree angle with that of the discharge pipe of the next lowermost station and with that of the next uppermost station.

While the invention has been described with respect to certain specific examples, it will be apparent that many other modifications are possible and it is not intended to limit the invention except defined by the following claims.

I claim:

1. An electrical power production system for generating electrical power from non-electrical energy of a form contained within a fluid and for delivering said electrical power to a high voltage transmission line comprising:
    a plurality of relatively low voltage electrical power production stations, each having at least one device for producing electrical power from the non-electrical energy content of said fluid and having insulative support means for said device enabling said device to be operated at an elevated voltage level, each of said stations having a lower voltage region and means for receiving said fluid at said lower voltage region, and each further having conduit means for transmitting said fluid to said device from said lower voltage region for conversion of said non-electrical energy content to electrical power, at least a portion of said conduit means being formed of electrically insulative material, and
    conductor means connecting said power production stations in series relationship and terminal means for connecting at least a final one thereof to said transmission line whereby the relatively low voltages produced by said power production stations individually are cumulatively applied to said transmission line to establish a relatively high voltage thereon.

2. The combination defined in claim 1 wherein said fluid is a fuel and wherein each of said stations has a plurality of said power production devices, said electrical power production device of each of said stations is of the form producing electrical power from chemical energy contained in said fuel and wherein said conduit means for transmitting said fluid to said device of each of said stations is at least one pipe for transmitting said fuel thereto, said pipe being formed at least in part of insulative material.

3. The combination defined in claim 2 wherein said electrical power production devices are fuel cell assemblies.

4. The combination defined in claim 2 wherein said electrical power production devices are magnetohydrodynamic devices.

5. The combination defined in claim 2 wherein said electrical power production devices are electrical generators driven by internal combustion engines situated on said insulative support means.

6. The combination defined in claim 1 wherein said fluid is steam and said electrical power production devices are generators driven by steam turbines supported on said insulative support means, and wherein said conduit means for transmitting said fluid to said electrical power production devices are steam conduits formed at least in part of electrically insulative material.

7. An electrical power production system for generating electrical power from consumable energy resources which occur at a plurality of geographically dispersed different localities and for delivering said electrical power to a high voltage transmission line comprising:
    a plurality of relatively low voltage electrical power production stations, each having at least one device for producing electrical power from other non-electrical energy and having insulative support means for said device enabling said device to be operated at an elevated voltage level, each of said stations having a lower voltage region and means for consuming said resources to provide said other non-electrical energy at said lower voltage region, and each further having insulative means for transmitting said other non-electrical energy to said device from said lower voltage region for conversion to electrical power, and
    conductor means for connecting said power production stations in series relationship and terminal means for connecting at least a final one thereof to said transmission line whereby the relatively low voltages produced by said power production stations individually are cumulatively applied to said transmission line to establish a relatively high voltage thereon,
    wherein said power production stations are each situated at a different one of said geographically dispersed localities and where each is operated from the local supplies of said consumable energy resources.

8. The combination defined in claim 7 wherein said electrical power production devices are electrical generators and said means for consuming said resources are internal combustion engines operated from said local supplies of said consumable resources, and wherein said insulative means are mechanical drive means coupling said engines to said generators.

9. The combination defined in claim 7 wherein said electrical power production devices are electrical generators and said means for consuming said resources energize direct current electrical motors and wherein said insulative means are mechanical drive means coupling said direct current electrical motors to said generators.

10. The combination defined in claim 9 wherein said means for consuming said resources comprise fuel cells coupled to said direct current electrical motors to energize said motors.

11. The combination defined in claim 7 wherein said insulative support means at each of said plurality of stations forms a building structure for maintaining said electrical power production device of said station at an elevated position above the ground and having access means for transporting objects from ground level to said elevated position, said access means comprising an inclined ramp at least a portion of which is formed of electrically insulative material.

12. An electrical power production system for generating electrical power from non-electrical energy sources and for delivering said electrical power to a high-voltage transmission line comprising:
   a plurality of relatively low-voltage electrical power production stations, each having at least one device for producing electrical power from other non-electrical energy and having insulative support means for said device enabling said device to be operated at an elevated voltage level, each of said stations having a lower voltage region and means for receiving said other non-electrical energy at said lower voltage region, and each further having insulative means for transmitting said other non-electrical energy to said device from said lower voltage region for conversion to electrical power, and
   conductor means for connecting said power production stations in series relationship and terminal means for connecting at least a final one thereof to said transmission line whereby the relatively low voltages produced by said power production stations individually are cumulatively applied to said transmission line to establish a relatively high voltage thereon, wherein each of said series connected power production stations has additional substantially similar power production stations electrically coupled thereto in parallel relationship therewith.

13. An electrical power production system for generating electrical power from non-electrical energy sources and for delivering said electrical power to a high-voltage transmission line comprising:
   a plurality of relatively low-voltage electrical power production stations, each having at least one device for producing electrical power from other non-electrical energy and having insulative support means for said device enabling said device to be operated at an elevated voltage level, each of said stations having a lower voltage region and means for receiving said other non-electrical energy at said lower voltage region, and each further having insulative means for transmitting said other non-electrical energy to said device from said lower voltage region for conversion to electrical power, and
   conductor means for connecting said power production stations in series relationship and terminal means for connecting at least a final one thereof to said transmission line whereby the relatively low voltages produced by said power production stations individually are cumulatively applied to said transmission line to establish a relatively high voltage thereon, wherein each of said power production stations has a plurality of said power production devices electrically connected in parallel to said conductor means and has means for selectively disconnecting any individual one of said power production devices from the others thereof.

14. The combination defined in claim 13 wherein each of said power production stations has at least one lower voltage terminal and at least one higher voltage terminal between which said power production devices are connected in parallel, further comprising a plurality of switch means each being connected between said terminals in series with an individual one of said power production devices whereby individual ones of said power production devices may be inactivated.

15. The combination defined in claim 14 further comprising means for detecting malfunction of any of said power production devices, and means for opening the one of said switch means associated with the malfunctioning power production device in response to said detection means.

16. The combination defined in claim 14 further comprising a normally open bypass switch connected between said terminals in parallel with said power production devices for effectively bypassing an individual one of said stations without interrupting power delivery through said system as a whole.

17. The combination defined in claim 16 further comprising means for producing a signal when a predetermined number of said switch means are opened, and means for closing said bypass switch in response to said signal.

18. An electrical power production system for generating electrical power from non-electrical energy sources and for delivering said electrical power to a high voltage transmission line comprising:
   a plurality of relatively low-voltage electrical power production stations, each having at least one device for producing electrical power from other non-electrical energy and having insulative support means for said device enabling said device to be operated at an elevated voltage level, each of said stations having a lower voltage region and means for receiving said other non-electrical energy at said lower voltage region, and each further having insulative means for transmitting said other non-electrical energy to said device from said lower voltage region for conversion to electrical power, and
   conductor means for connecting said power production stations in series relationship and terminal means for connecting at least a final one thereof to said transmission line whereby the relatively low voltages produced by said power production stations individually are cumulatively applied to said transmission line to establish a relatively high voltage thereon,
   wherein said insulative support means of said plurality of power production stations are of progressively increasing height.

19. An electrical power production system for generating electrical power from non-electrical energy sources and for delivering said electrical power to a high-voltage transmission line comprising:
   a plurality of relatively low-voltage electrical power production stations, each having at least one device for producing electrical power from other non-electrical energy and having insulative support means of said device enabling said device to be operated at an elevated voltage level, each of said stations having a lower voltage region and means for receiving said other non-electrical energy at said lower voltage region, and each further having insulative means for transmitting said other non-electrical energy to said device from said lower voltage region for conversion to electrical power, and conductor means for connecting said power production stations in series relationship and terminal means for connecting at least a final one thereof to said transmission line whereby the relatively low voltages produced by said power production stations individually are cumulatively applied to said transmission line to establish a relatively high voltage thereon, wherein said power production stations are horizontally spaced apart a distance exceeding the distance across which the voltage difference between successive pairs of said stations can arc and further comprising access means extending horizontally between said stations, said access means being formed at least in part of insulative material.

20. The combination defined in claim 19 wherein said insulative support means of said stations are of progressively increased height at each station and wherein said stations are spaced apart along a down sloping surface with the highest of said stations being on the lowermost portion of said down sloping surface whereby said power production devices of each of said stations are at substantially the same level and wherein said access means extends horizontally between said stations substantially at said level of said power production devices.

21. An electrical power production system for generating electrical power from non-electrical energy sources and for delivering said electrical power to a high voltage transmission line comprising:

a plurality of relatively low-voltage electrical power production stations, each having at least one device for producing electrical power from other non-electrical energy and having insulative support means for said device enabling said device to be operated at an elevated voltage level, each of said stations having a lower voltage region and means for receiving said other non-electrical energy at said lower voltage region, and each further having insulative means for transmitting said other non-electrical energy to said device from said lower voltage region for conversion to electrical power, and conductor means for connecting said power production stations in series relationship and terminal means for connecting at least a final one thereof to said transmission line whereby the relatively low voltages produced by said power production stations individually are cumulatively applied to said transmission line to establish a relatively high voltage thereon, wherein said plurality of power production stations are disposed in vertically spaced relationship with the one thereof which is coupled to said transmission line being uppermost, said insulative support means of said plurality of stations jointly forming a single building structure.

22. The combination defined in claim 21 wherein said building structure comprises a plurality of vertically spaced apart electrically conductive floors separated by said insulative support means and supporting said electrical power production devices.

23. The combination defined in claim 22 wherein at least the uppermost ones of said electrically conductive floors extend outwardly from said building structure and have rounded edges for inhibiting corona discharge and wherein said electrical power production devices have at least one lower voltage terminal electrically connected to the adjacent supportive floor and have at least one higher voltage terminal electrically connected to the next higher floor.

24. An electrical power production system for generating electrical power from non-electrical energy sources and for delivering said electrical power to a high voltage transmission line comprising:

a plurality of relatively low-voltage electrical power production stations, each having at least one device for producing electrical power from other non-electrical energy and having insulative support means for said device enabling said device to be operated at an elevated voltage level, wherein said insulative support means forms a building structure for maintaining said electrical power production device at an elevated region above the ground each of said stations having a lower voltage region and means for receiving said other nonelectrical energy at said lower voltage region, and each further having insulative means for transmitting said other nonelectrical energy to said device from said lower voltage region for conversion to electrical power, conductor means for connecting said power production stations in series relationship and terminal means for connecting at least a final one thereof to said transmission line whereby the relatively low voltages produced by said power production stations individually are cumulatively applied to said transmission line to establish a relatively high voltage thereon, and access means for transporting objects from ground level to said elevated region, said access means comprising an elevator, hoist means extending from ground level to the region of said electrical power device for selectively raising and lowering said elevator, all portions of said hoist means extending between said elevator and said elevated region being formed at least in part of insulative materials.

25. The combination defined in claim 24 wherein said elevator is a substantially closed gondola formed of electrically conductive material.

26. An electrical power production system for generating electrical power from non-electrical energy sources and for delivering said electrical power to a high-voltage transmission line comprising:

a plurality of relatively low-voltage electrical power production stations, each having at least one electrical generator and having insulative support means for said generator enabling said generator to be operated at an elevated voltage level, each of said stations having a lower voltage region and at least one hydraulic turbine thereat, and each further having insulative mechanical drive means for coupling said turbine to said generator to drive said generator, conductor means for connecting said power production stations in series relationship and terminal means for connecting at least a final one thereof to said transmission line whereby the relatively low voltages produced by said power production stations individually are cumulatively applied to said transmission line to establish a relatively high voltage thereon, an upper reservoir above at least one of said stations, first conduit means for transmitting water under pressure from said upper reservoir to said turbine to drive said turbine, a lower reservoir below said one station, second conduit means for transmitting the fluid discharge from said one station to said lower reservoir, an electrically powered pumping station for returning fluid from said lower reservoir to said upper reservoir, and solar energy conversion means for producing electrical power to drive said pumping station.

27. An electrical power production system for generating electrical power from non-electrical energy sources and for delivering said electrical power to a high-voltage transmission line comprising:

a plurality of relatively low-voltage electrical power production stations, each having at least one device for producing electrical power from other non-electrical energy and having insulative support means for said device enabling said device to be operated at an elevated voltage level, each of said stations having a lower voltage region and means for receiving said other non-electrical energy at said lower voltage region, and each further having insulative means for transmitting said other non-electrical energy to said device from said lower voltage region for conversion to electrical power, and conductor means for connecting said power production stations in series relationship and terminal means for connecting at least a final one thereof to said transmission line whereby the relatively low voltages produced by said power production stations individually are cumulatively applied to said transmission line to establish a relatively high voltage thereon, wherein said electrical power production device at each of said stations is a generator, said generator comprising a rotor shaft, a plurality of magnetic field establishing rotors carried on said rotor shaft and being axially spaced apart thereon, and a plurality of axially spaced apart stator windings each being adjacent an individual one of said rotors, said plurality of stator windings being electrically connected together in series relationship whereby the voltages produced by said stator windings are additive.

28. The combination defined in claim 27 wherein said transmission line is a direct current transmission line and said generators are direct current generators and wherein each successive rotor and stator winding combination of each generator is oriented to produce current which is out of phase with that produced by at least one other rotor and stator winding combination of said generator whereby ripple in the output of said generator is reduced.

29. An electrical utility power generating station comprising:

at least one device for producing electrical power from a fluid having a non-electrical energy content, insulative support means below said device supporting said device and electrically isolating said device from ground to enable said device to be at an electrical voltage substantially above ground potential, means situated in a region substantially at ground potential for receiving said fluid, conduit means extending from said receiving means at said region at ground potential to said device for transmitting said fluid thereto, at least a portion of said conduit means being formed of electrically insulative material, and terminal means for electrically coupling said device to a high voltage power transmission line to add on increment of voltage and power to said line.

30. An electrical power generating station as defined in claim 29 wherein said fluid is a consumable fuel and said device for producing electrical power from said fluid is a fuel-consuming device and wherein said conduit means is at least one fuel conduit extending to said device from a region at ground potential, at least a portion of said fuel conduit being formed of electrically insulative material.

31. An electrical power generating station as defined in claim 30 wherein said fuel-consuming electrical power production device comprises a fuel cell or a magnetohydrodynamic device or a generator driven by an internal combustion engine.

32. An electrical power-generating station as defined in claim 29 wherein said conduit means for transmitting said fluid to said device is a fuel conduit extending to said device from a region at ground potential and being formed at least in part of insulative material, and wherein said electrical power-producing device comprises a direct current producing means consisting of fuel cells or magnetohydrodynamic devices, and further comprises a direct current motor energized by said direct current-producing means, and an alternating current generator mechanically coupled to said direct current motor and driven thereby.

33. The combination defined in claim 29 wherein said fluid is steam and wherein said electrical power production device is a generator, further comprising a steam turbine supported on said insulative support means and drivingly coupled to said generator, and wherein said conduit means is at least one steam conduit extending to said turbine from a region at ground potential, at least a section of said steam conduit being formed of electrically insulative material.

34. An electrical utility power generating station comprising:

at least one device for producing electrical power from a different non-electrical form of energy, insulative support means below said device for supporting said device and for electrically isolating said device from ground to enable said device to be at an electrical voltage substantially above ground potential, means situated in a region substantially at ground potential for receiving said different non-electrical form of energy, insulative means extending from said region of ground potential to said device for transmitting said different non-electrical form of energy thereto, an electrically conductive floor supported on said insulative support means and in turn supporting said electrical power production device, and an electrically conductive enclosure substantially enclosing said electrical power production device and being in electrical contact with said floor.

35. The combination defined in claim 34 further comprising at least one insulator transpierced through said electrically conductive enclosure and wherein at least one terminal of said power production device is electrically connected to said enclosure and at least one other terminal of said device is connected with conductor means extending out of said enclosure through said insulator.

36. An electrical utility power generating station comprising:
a plurality of devices for producing electrical power from a different non-electrical form of energy,
insulative support means below said devices for supporting said devices and for electrically isolating said devices from ground to enable said devices to be at an electrical voltage substantially above ground potential,
means situated in a region substantially at ground potential for receiving said different non-electrical form of energy,
insulative means extending from said region of ground potential to said devices for transmitting said different non-electrical form of energy thereto,
terminal means for coupling said station to a high-voltage power transmission line,
said devices being electrically connected to said terminal means in parallel with each other.

37. An electrical utility power generating station comprising:
at least one device for producing electrical power from a different non-electrical form of energy, wherein said electrical power production device is an alternating current generator,
insulative support means below said generator for supporting said generator and for electrically isolating said generator from ground to enable said generator to be at an electrical voltage substantially above ground potential,
means situated in a region substantially at ground potential for receiving said different non-electrical form of energy and for producing mechanical energy therefrom,
insulative mechanical drive means extending from said region of ground potential to said generator, and
terminal means for transmitting electrical power from said generator to a high-voltage electrical power transsion line.

38. The combination defined in claim 37 further comprising a voltage step-up transformer supported on said insulative support means and electrically coupled between said generator and said terminal means.

39. The combination defined in claim 37 further comprising an alternating current rectifier means disposed on said insulative support means and electrically coupled between said generator and said terminal means for rectifying the alternating current output of said generator.

40. An electrical utility power generating station comprising:
at least one electrical generator for producing electrical power from a different non-electrical form of energy,
insulative support means below said generator for supporting said generator at an elevated position above the ground for electrically isolating said generator ground to enable said generator to be at an electrical voltage substantially above ground potential,
a motor situated below said generator in a region substantially at ground potential for converting said non-electrical form of energy to rotary mechanical energy, and
a drive shaft extending upwardly from said motor to said generator for transmitting said rotary mechanical energy upwardly to said generator, at least a section of said drive shaft being formed of electrically insulative material.

41. An electrical utility power-generating station comprising:
at least one electrical generator,
insulative support means below said generator for supporting said generator and for electrically isolating said generator from ground to enable said generator to be at an electrical voltage substantially above ground potential,
a direct current electrical motor situated in a region substantially at ground potential and spaced apart from said generator and drivingly coupled thereto through a drive shaft formed at least in part of insulative material,
a fuel cell assembly electrically coupled to said direct current motor to energize said motor, and
means for supplying fuel to said fuel cell assembly.

42. An electrical utility power-generating station comprising at least one generator having a rotor shaft, said generator further having a plurality of rotors for producing magnetic fields, said rotors being spaced apart along said rotor shaft, said generator also having a plurality of stator windings each being adjacent on associated individual one of said rotors and having conductor means connecting said stator windings in series relationship whereby the voltages produced in each thereof are additively combined, each of the rotor and stator winding combinations being oriented to produce current which is out of phase with the current produced by at least one other of said rotor and stator winding combinations,
insulative support means below said generator for supporting said generator and for electrically isolating said generator from ground to enable said generator to be at an electrical voltage substantially above ground potential,
means situated in a region substantially at ground potential for receiving non-electrical energy for driving said generator, and
insulative means extending from said region of ground potential to said generator for transmitting said non-electrical driving energy thereto.

43. An electrical utility power-generating station comprising:
at least one device for producing electrical power from a different non-electrical form of energy, said device being situated at an elevated position spaced above the ground,
insulative support means below said device for supporting said device and for electrically isolating said device from ground to enable said device to be at an electrical voltage substantially above ground potential,
means situated in a region substantially at ground potential for receiving said different non-electrical form of energy, and
insulative means extending from said region of ground potential to said device for transmitting said different non-electrical form of energy thereto,
terminal means for electrically coupling said device to a high-voltage transmission line, and
safe access means having an elevator for receiving objects to be transported to the region of said electrical power production device and further having powered hoist means for raising and lowering said elevator relative to said power production device, the portions of said hoist means which extend between said region of said power production device and said ground potential region being formed at least in part of insulative material.

44. An electrical utility power generating station comprising:
- at least one device for producing electrical power from a different non-electrical form of energy,
- insulative support means below said device for supporting said device and for electrically isolating said device from ground to enable said device to be at an electrical voltage substantially above ground potential,
- means situated in a region substantially at ground potential for receiving said different non-electrical form of energy,
- insulative means extending from said region of ground potential to said device for transmitting said different non-electrical form of energy thereto,
- at least a pair of output terminals coupled to said electrical power producing device for series connection of said generating station into a high-voltage transmission line,
- normally open by-pass switch means connected between said terminals in parallel relation to said power producing device, whereby said station may be connected into said transmission line in series relationship to function as a power booster for compensating for transmission line losses and may be selectively decoupled from said line without interrupting continuity of said line.

45. A power distribution system for transferring electrical power from a high-voltage transmission line to a relatively low-voltage conductors comprising:
- a plurality of power distribution stations each having at least one electrical motor supported on insulative support structure and each having at least one electrical generator spaced apart from said motor and driven thereby through insulative drive means extending therebetween, said generator being situated in a region substantially at ground potential, and wherein said distribution stations are horizontally spaced apart and wherein said insulative support structure for said motor of successive ones of said stations are of progressively less height,
- conductor means connecting said motor of each of said plurality of distribution stations in series relationship with said motor of each of the others of said stations and conecting said motor of at least an initial one of said stations to said high-voltage transmission line whereby said motor of each of said stations operates at a progressively lower voltage level while said generator of each of said stations operates substantially at ground potential and produces relatively lower voltages.

* * * * *

UNITED STATES PATENT OFFICE
CERTIFICATE OF CORRECTION

Patent No. 4,057,736            Dated November 8, 1977

Inventor(s) Morris R. Jeppson

It is certified that error appears in the above-identified patent and that said Letters Patent are hereby corrected as shown below:

Column 1, line 6   - the comma after "producing" should be deleted.

Column 8, line 25   - "ech" should read --each--.

Column 8, line 37   - "generation" should read --generating--.

Column 8, line 44   - after "19a", "L" should be deleted.

Column 10, line 2   - "amines" should read --mines--.

Column 11, line 26 - "cells" should read --cell--.

Column 11, line 68 - "849" should read --84g--.

Column 13, line 27 - "22b" should read --22h--.

Column 13, line 47 - after "itself", --scattered-- should be inserted.

UNITED STATES PATENT OFFICE
CERTIFICATE OF CORRECTION

Patent No. 4,057,736  Dated November 8, 1977

Inventor(s) Morris R. Jeppson

It is certified that error appears in the above-identified patent and that said Letters Patent are hereby corrected as shown below:

Column 15, line 57 - "delectrical" should read --electrical--.

Column 16, line 11 - after "terminal" --108-- should be inserted.

Column 16, line 14 - "220ko" should read --22ko--.

Column 16, line 37 - before "carrying", "by" should read --be--.

Column 17, line 51 - after "112", "i" should read --is--.

Column 20, line 48 - "volmeter" should read --voltmeter--.

Column 22, line 2 - "a" should read --an--.

Column 23, line 21 - "temproary" should read --temporary--.

Column 23, line 43 - "hereintofore" should read --hereinbefore--

UNITED STATES PATENT OFFICE
CERTIFICATE OF CORRECTION

Patent No. 4,057,736      Dated November 8, 1977

Inventor(s) Morris R. Jeppson

It is certified that error appears in the above-identified patent and that said Letters Patent are hereby corrected as shown below:

Column 33, line 59 - before "ground" insert --from--.

Column 34, line 24 - "on" should read --an--.

Column 36, line 4 - after "to", "a" should be deleted.

Signed and Sealed this

Eighteenth Day of April 1978

[SEAL]

Attest:

RUTH C. MASON
Attesting Officer

LUTRELLE F. PARKER
Acting Commissioner of Patents and Trademarks